US012747137B2

(12) United States Patent
Kashiwakura

(10) Patent No.: US 12,747,137 B2
(45) Date of Patent: Sep. 29, 2026

(54) CAR OF ELEVATOR, AND ELEVATOR

(71) Applicant: FUJITEC CO., LTD., Shiga (JP)

(72) Inventor: Hiroshi Kashiwakura, Shiga (JP)

(73) Assignee: FUJITEC CO., LTD., Shiga (JP)

( * ) Notice: Subject to any disclaimer, the term of this patent is extended or adjusted under 35 U.S.C. 154(b) by 0 days.

(21) Appl. No.: 19/026,618

(22) Filed: Jan. 17, 2025

(65) Prior Publication Data

US 2025/0282577 A1 Sep. 11, 2025

(30) Foreign Application Priority Data

Mar. 11, 2024 (JP) ................................ 2024-036831
Mar. 12, 2024 (JP) ................................ 2024-037821

(51) Int. Cl.
*B66B 13/08* (2006.01)

(52) U.S. Cl.
CPC .................................... *B66B 13/08* (2013.01)

(58) Field of Classification Search
CPC .......... B66B 13/08; B66B 13/06; B66B 13/02
See application file for complete search history.

(56) References Cited

U.S. PATENT DOCUMENTS 5,323,876 A * 6/1994 Mcallister et al.
12,234,124 B2 * 2/2025 Kashiwakura .......... B66B 13/22

FOREIGN PATENT DOCUMENTS

CN 201665461 12/2010
EP 2338823 A1 * 6/2011 ............ B66B 13/08
FR 2595677 A1 * 9/1987 ............ B66B 13/08
JP 04371482 A * 12/1992
JP H07237863 9/1995
JP 2009208947 A * 9/2009
JP 2009249155 A * 10/2009
JP 2010208761 9/2010
JP 2011514298 5/2011
JP 2022158068 10/2022
JP 2023162534 11/2023
JP 2024048579 4/2024
WO 2009029380 3/2009

OTHER PUBLICATIONS

"Office Action of Japan Counterpart Application", issued on Apr. 30, 2024, with English translation thereof, p. 1-p. 7.
"Office Action of Japan Counterpart Application", issued on Apr. 12, 2024, with English translation thereof, p. 1-p. 6.
"Office Action of Japan Related Application, Application No. 2025-153242", issued on Nov. 6, 2025, with partial English translation thereof, p. 1-p. 5.

* cited by examiner

*Primary Examiner* — Diem M Tran
(74) *Attorney, Agent, or Firm* — JCIPRNET

(57) ABSTRACT

Provided are a car of an elevator, and an elevator that achieve weight reduction for a support frame. The support frame includes brackets at multiple locations on an upper edge, and supports a first pulley, a second pulley, and a door position detection part via the brackets. This eliminates the need to secure an area on a front face of the support frame for arranging the first pulley, the second pulley, and the door position detection part. Therefore, the height dimension of the support frame can be reduced to achieve weight reduction for the support frame.

18 Claims, 23 Drawing Sheets

CAR OF ELEVATOR, AND ELEVATOR

CROSS-REFERENCE TO RELATED APPLICATION

This application claims the priority benefits of Japanese application no. 2024-036831, filed on Mar. 11, 2024, and Japanese application no. 2024-037821, filed on Mar. 12, 2024. The entirety of the above-mentioned patent applications is hereby incorporated by reference herein and made a part of this specification.

BACKGROUND

Technical Field

The disclosure relates to a car of an elevator, and an elevator that include a car door device.

Description of Related Art

There is known a car of this type, which includes: (i) a door rail provided along an upper edge of an entrance of the car in the left-right direction, (ii) a car door supported to be slidable on the door rail, (iii) a first pulley and a second pulley provided to be spaced apart in the left-right direction above the door rail, (iv) a drive belt wound around the first pulley and the second pulley and operatively connected to the car door, and (v) a plate-shaped support frame supporting the door rail, the first pulley, and the second pulley on a front face (Japanese Patent Application Laid-Open No. 2011-514298).

However, due to the arrangement of the door rail, the first pulley (and a drive motor in the case where the drive motor is directly connected to the first pulley), and the second pulley on the front face of the support frame, the conventional car faces a problem that the height dimension of the support frame is large, which results in an increase in the weight of the support frame.

SUMMARY

In view of such circumstances, the disclosure provides a car of an elevator, and an elevator that achieve weight reduction for the support frame.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The car of the elevator, comprises:

- a door rail, supporting a car door to be slidable in a left-right direction;
- a first pulley and a second pulley provided to be spaced apart in the left-right direction above the door rail, and a drive belt operatively connected to the car door and being wound around the first pulley and the second pulley;
- a door position detection part, detecting that the car door is at a predetermined position; and
- a support frame, comprising the door rail on a front face and brackets at a plurality of locations on an upper edge, and the support frame supporting the first pulley, the second pulley, and the door position detection part via the brackets,
- wherein the car door comprises a roller that engages with an upper edge of the door rail from above and rotates, and
- the upper edge of the support frame is positioned lower than an uppermost portion of the roller.

The aforementioned car of the elevator can be configured such that further comprises:

a drive motor, directly connected to the first pulley, wherein the drive motor is supported on the support frame via one of the brackets.

The aforementioned car of the elevator can be configured such that the brackets are attached to a rear face of a main body part of the support frame.

The aforementioned car of the elevator can be configured such that the support frame is a member that is long in the left-right direction and is arranged along a vertical plane, and

- the first pulley, the second pulley, and the door position detection part are arranged in an open space between a front offset plane and a rear offset plane with reference to the vertical plane of the support frame, above the support frame.

The aforementioned car of the elevator can be configured such that further comprises:

- a cover that covers a part or entirety of the open space from front, rear, and above.

The aforementioned car of the elevator can be configured such that the support frame comprises:

- a main body part; and
- a front protrusion part that protrudes forward from at least a part of an upper edge of the main body part,
- the bracket supporting the drive motor has an upper face in a part, and is attached to the support frame so that the upper face is at the same height position as an upper face of the front protrusion part, and
- the drive motor has a base face, and is attached to the bracket so that the base face straddles and contacts the upper face of the front protrusion part and the upper face of the bracket.

The aforementioned car of the elevator can be configured such that the drive motor is attached to the bracket so that a tip of the base face aligns with a tip of the upper face of the front protrusion part.

The aforementioned car of the elevator can be configured such that the support frame comprises:

- a main body part; and
- a front protrusion part that protrudes forward from at least a part of an upper edge of the main body part, and
- the brackets have an upper face in a part, and is attached to the support frame so that the upper face is at the same height position as an upper face of the front protrusion part.

The aforementioned car of the elevator can be configured such that the brackets are attached to the support frame using a fastener that is able to be fixed and released by a rotational operation from front of the support frame.

The aforementioned car of the elevator can be configured such that the car door comprises:

- a door panel; and
- a door hanger that is attached to an upper end portion of the door panel,
- the door hanger comprises an extension part where a portion of a main body part of the support frame protrudes and extends upward, and the car door is connected to the drive belt at the extension part.

The aforementioned car of the elevator can be configured such that the extension part comprises a detection piece for the door position detection part.

The aforementioned car of the elevator can be configured such that the support frame comprises a pair of brackets spaced apart in the left-right direction on a rear face, and each of the pair of brackets comprises:

a main body part, attached to the support frame; and a rear protrusion part, protruding rearward from an upper portion of the main body part, wherein a lower end of the main body part and a tip of the rear protrusion part are grounded to function as a base of the support frame.

The aforementioned car of the elevator can be configured such that each of the pair of brackets has a length in an up-down direction that is longer than a length of the support frame in the up-down direction.

The aforementioned car of the elevator can be configured such that each of the pair of brackets is attached to the support frame so as to be changeable in position in the up-down direction.

The aforementioned car of the elevator can be configured such that each of the pair of brackets comprises an engaged part for a suspension tool at a location on the rear protrusion part that is behind a center of gravity of an integrated structure of the door rail, the drive motor, the first pulley, the second pulley, and the support frame.

The car of the elevator, comprises:

a door rail, supporting a car door to be slidable in a left-right direction;

a first pulley and a second pulley provided to be spaced apart in the left-right direction above the door rail, and a drive belt operatively connected to the car door and being wound around the first pulley and the second pulley;

a door position detection part, detecting that the car door is at a predetermined position; and a support frame, comprising the door rail on a front face and brackets at a plurality of locations on an upper edge, and the support frame supporting the first pulley, the second pulley, and the door position detection part via the brackets, wherein the brackets are attached to the support frame using a fastener that is able to be fixed and released by a rotational operation from front of the support frame.

The elevator comprises the car of the elevator.

BRIEF DESCRIPTION OF THE DRAWINGS

The aforementioned features and the other features of the present invention will be clarified by the following description and figures illustrating the embodiments of the present invention.

DESCRIPTION OF THE EMBODIMENTS

The following describes an embodiment of the elevator according to the disclosure. In the following description, when a person standing on the floor looks at the car (the state of FIG. 2A and FIG. 2B), the left side is referred to as "left," the right side is referred to as "right," the horizontal direction from left to right or from right to left is referred to as "left-right direction," and the left-right direction is denoted as X in appropriate figures. Additionally, when a person standing on the floor looks at the car (the state of FIG. 2A and FIG. 2B), the side close to the person is referred to as "front," the side far from the person is referred to as "back" or "rear," the horizontal direction from front to rear or from rear to front is referred to as "front-rear direction," and the front-rear direction is denoted as Y in appropriate figures. The left-right direction and the front-rear direction are two perpendicular directions in the horizontal plane. Furthermore, the up-down direction is synonymous with the vertical direction, and is perpendicular to both the left-right direction and the front-rear direction.

Figure 1:
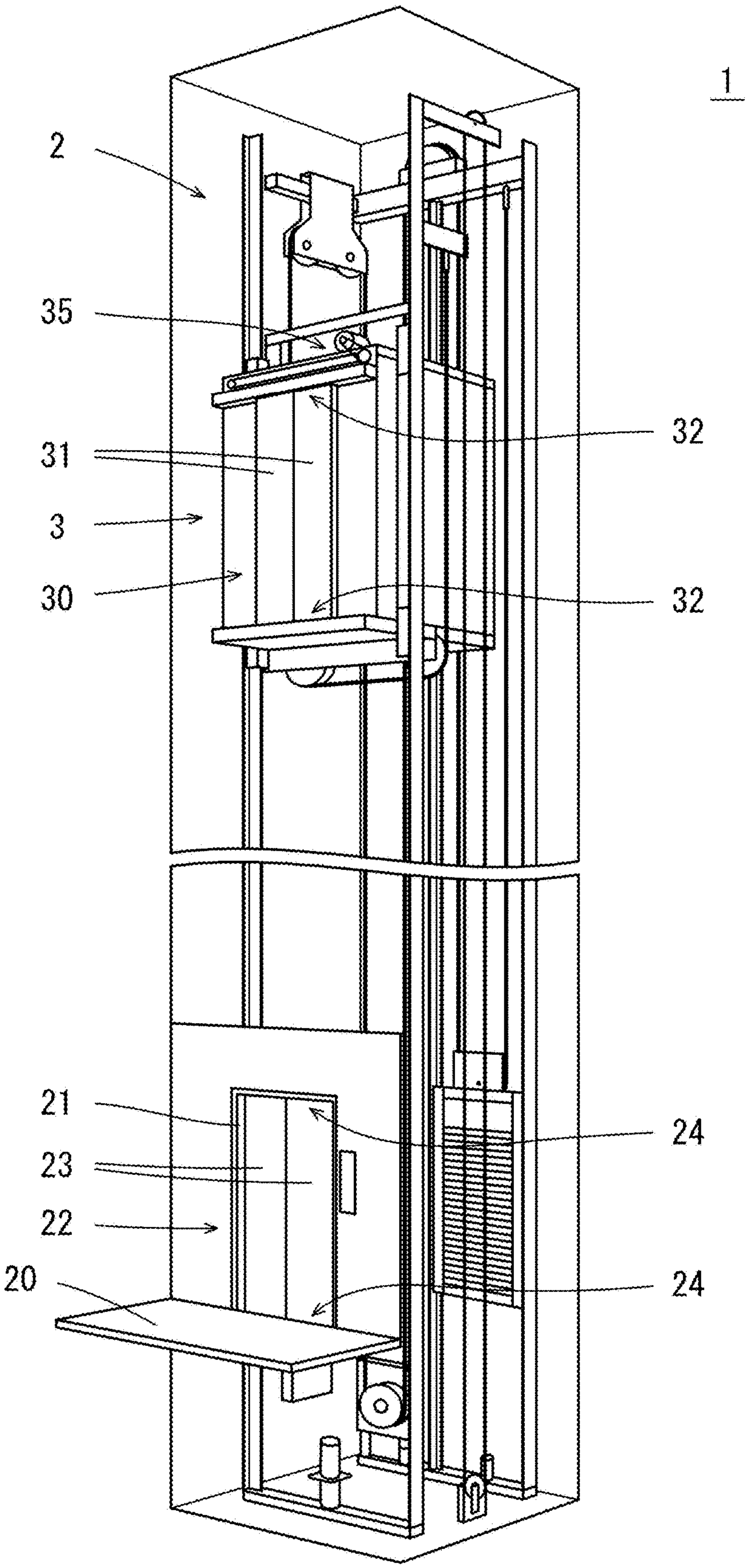
FIG. 1 is a perspective view of the elevator.

As shown in FIG. 1, an elevator 1 includes a hoistway 2 and a car 3. The hoistway 2 extends in the up-down direction within a building that has multiple floors. The car 3 ascends and descends within the hoistway 2 by the operation of a drive mechanism, and stops at a designated floor in response to the drive mechanism stopping the operation.

The car 3 includes a car door device 30. The car door device 30 includes car doors 31, a door support structure 32, and a door opening/closing device 35. The car doors 31 move in the left-right direction to open and close an opening (car entrance) on the front face of the car 3, allowing a passenger to enter and exit. The door support structure 32 is a structure that supports the car doors 31 while allowing the car doors 31 to open and close. The door opening/closing device 35 is a device for opening and closing the car doors 31.

On the other hand, a landing 20 on each floor includes a three-sided frame 21 and a landing door device 22. The three-sided frame 21 is formed in a wall surface, with the interior of the frame forming an opening corresponding in size to the opening of the car 3. The landing door device 22 includes landing doors 23 and a door support structure 24. The landing doors 23 move in the left-right direction to open and close the opening (landing entrance) within the three-sided frame 21, allowing a passenger to enter and exit. The landing doors 23 are normally closed by an elastic force, and are opened following the opening of the car doors 31 of the car 3 stopped at the floor and are closed along with the closing of the car doors 31. The door support structure 24 is a structure that supports the landing doors 23 while allowing the landing doors 23 to open and close.

Figure 2A:
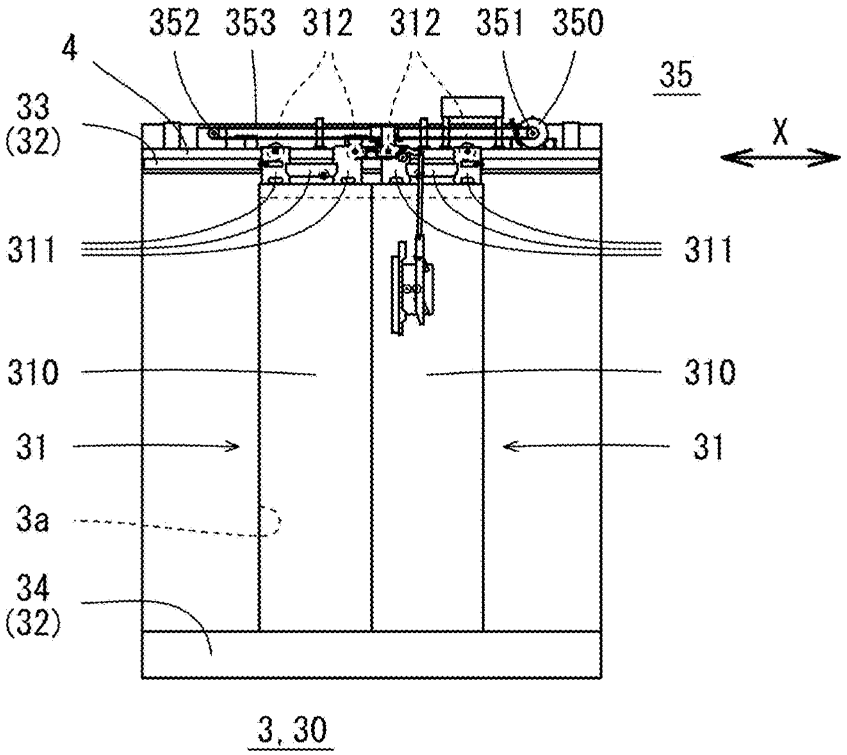
FIG. 2A is a front view of the car with the car door closed, as viewed from the landing side.
Figure 2B:
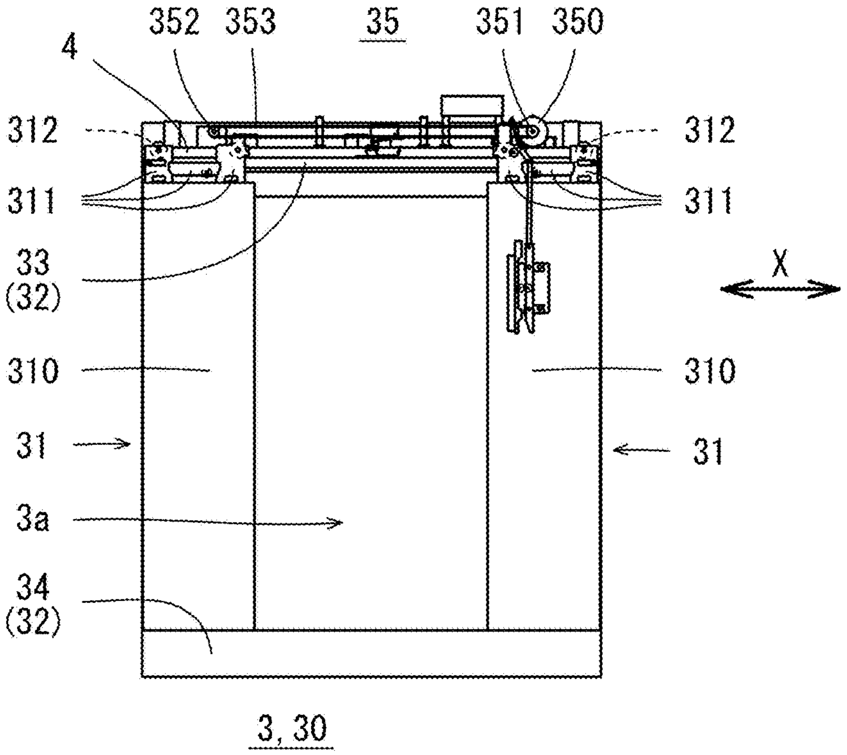
FIG. 2B is a front view of the car with the car door opened.

As shown in FIG. 2A and FIG. 2B, the car door 31 includes a door panel 310 and a door hanger 311. The door panel 310 is arranged along the vertical plane, and is a main body serving as the door of the car door 31 for opening and closing the opening 3*a* of the car 3. The door hanger 311 is integrally attached to the upper end portion of the door panel 310. The door hanger 311 includes a pair of rollers 312. The pair of rollers 312 are provided at the upper end portion of the door hanger 311, and spaced apart in the left-right direction.

The door support structure 32 includes a door rail 33 and a sill 34. The door rail 33 is a plate-shaped member that is straight, long in the left-right direction, flat, and has a rectangular shape. The door rail 33 is provided in the left-right direction on the upper portion of the front face of the car 3, along the upper edge of the opening 3*a* of the car 3, with both ends extending to the left and right beyond the upper edge of the opening 3*a*. The car doors 31 are suspended from the door rail 33 in a state where the car doors 31 are slidable in the left-right direction along the door rail 33, as the rollers 312 of the door hanger 311 engage with the upper edge of the door rail 33 from above and rotate. The door rail 33 is a structure that supports the upper portions of the car doors 31 while allowing the car doors 31 to open and close. On the other hand, the sill 34 is provided in the left-right direction on the lower portion of the front face of the car 3, along the lower edge of the opening 3*a* of the car 3, with both ends extending to the left and right beyond the lower edge of the opening 3*a*. The sill 34 is a structure that supports the lower portions of the car doors 31 while allowing the car doors 31 to open and close.

Figure 3:
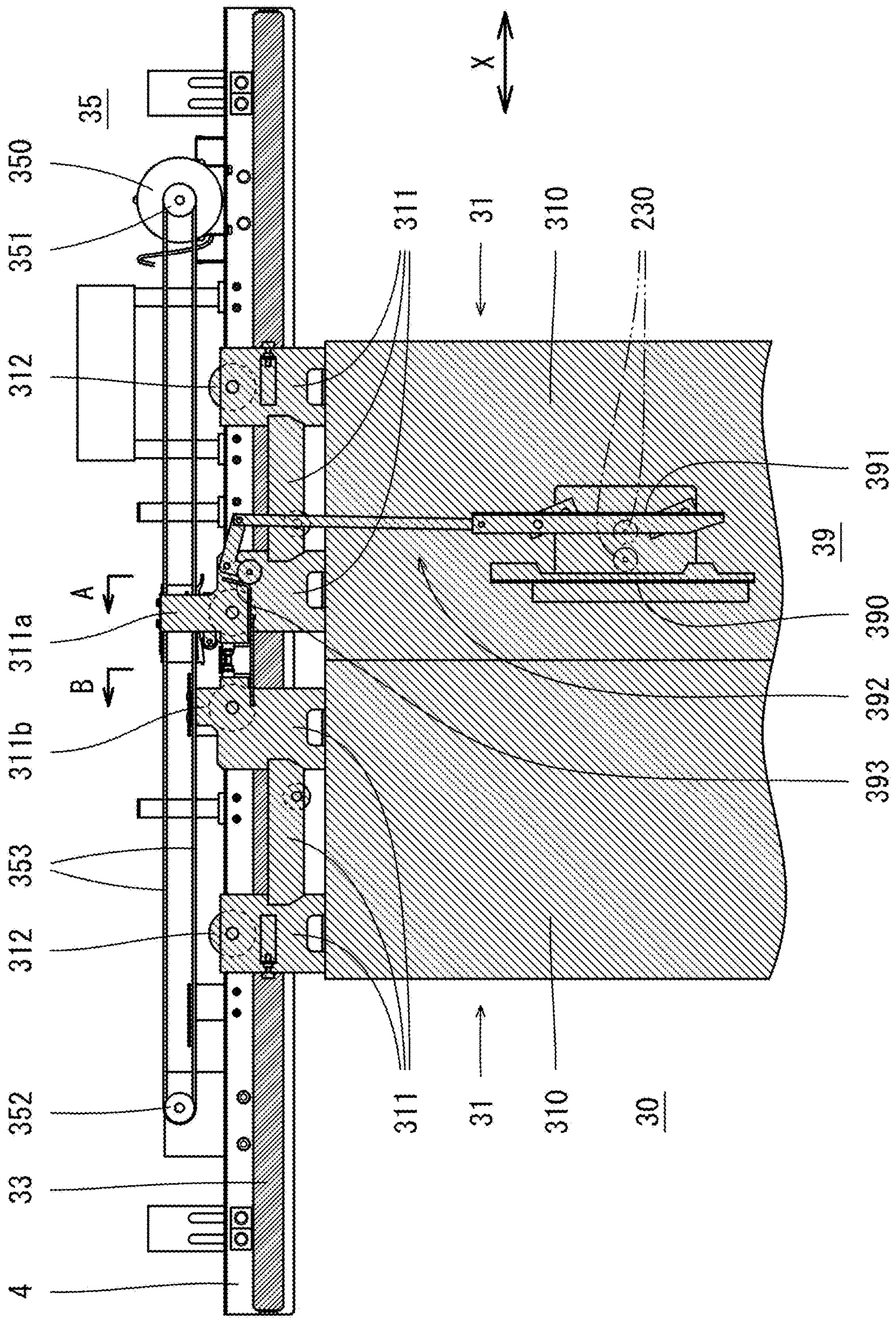
FIG. 3 is a front view of the upper portion of the car with the car door closed.
Figure 4:
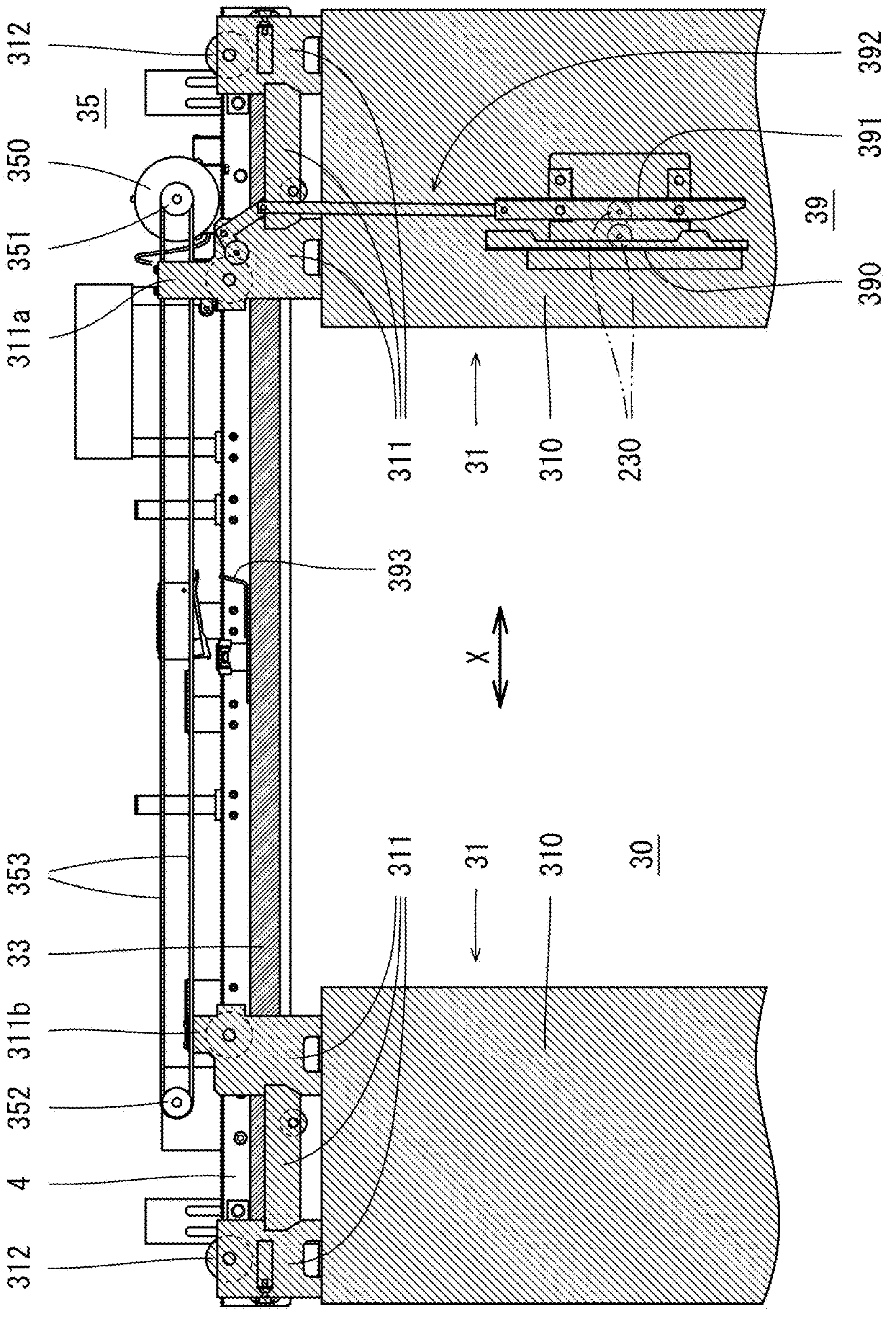
FIG. 4 is a front view of the upper portion of the car with the car door opened.

As shown in FIG. 3 and FIG. 4, the door opening/closing device 35 includes a drive motor 350, a drive pulley 351, an idler pulley 352, and a drive belt 353. The drive motor 350 is provided on either the left or right end side of the upper portion of the front face of the car 3. The drive pulley 351 is provided coaxially and integrally with the drive shaft of the drive motor 350 and is directly connected to the drive motor 350. The idler pulley 352 is provided on the other end side of the upper portion of the front face of the car 3. The drive belt 353 is an endless belt wound around the drive pulley 351 and the idler pulley 352. The drive belt 353 is provided in the left-right direction in parallel to the door rail 33.

In response to the drive motor 350 operating, the drive pulley 351 rotates, and accordingly, the drive belt 353 circulates. As a result, the two car doors 31 (hatched portions) on the left and right reciprocate along the door rail 33 (hatched portion) to open and close. One car door 31 is connected to one side of the drive belt 353. The other car door 31 is connected to the other side of the drive belt 353. Thus, the pair of car doors 31 move in opposite directions to each other. In other words, the car door device 30 and the landing door device 22 are of the center-opening type that the opening 3*a* of the car 3 opens from the center.

Here, the connecting structure between the car door 31 and the drive belt 353 will be described in detail. The door hanger 311 of the car door 31 includes a pair of first members and a second member. The pair of first members and the second member are plate-shaped members. The pair of first members are spaced apart in the left-right direction, and each is integrally attached to the door panel 310 at the upper end portion of the door panel 310. The second member connects the pair of first members. In one car door 31, the door hanger 311 includes an extension part 311*a* extending upward. In the other car door 31, the door hanger 311 includes an extension part 311*b* extending upward. The extension part 311*a* and the extension part 311*b* are formed on the left half portion or the right half portion divided by the center line in the left-right direction of the first member. The first member is manufactured by cutting out the entire shape from a single plate material. Therefore, the extension part 311*a* and the extension part 311*b* are each a portion of the main body part of the first member which protrudes upward, and are integrally provided with the main body part.

Figure 5A:
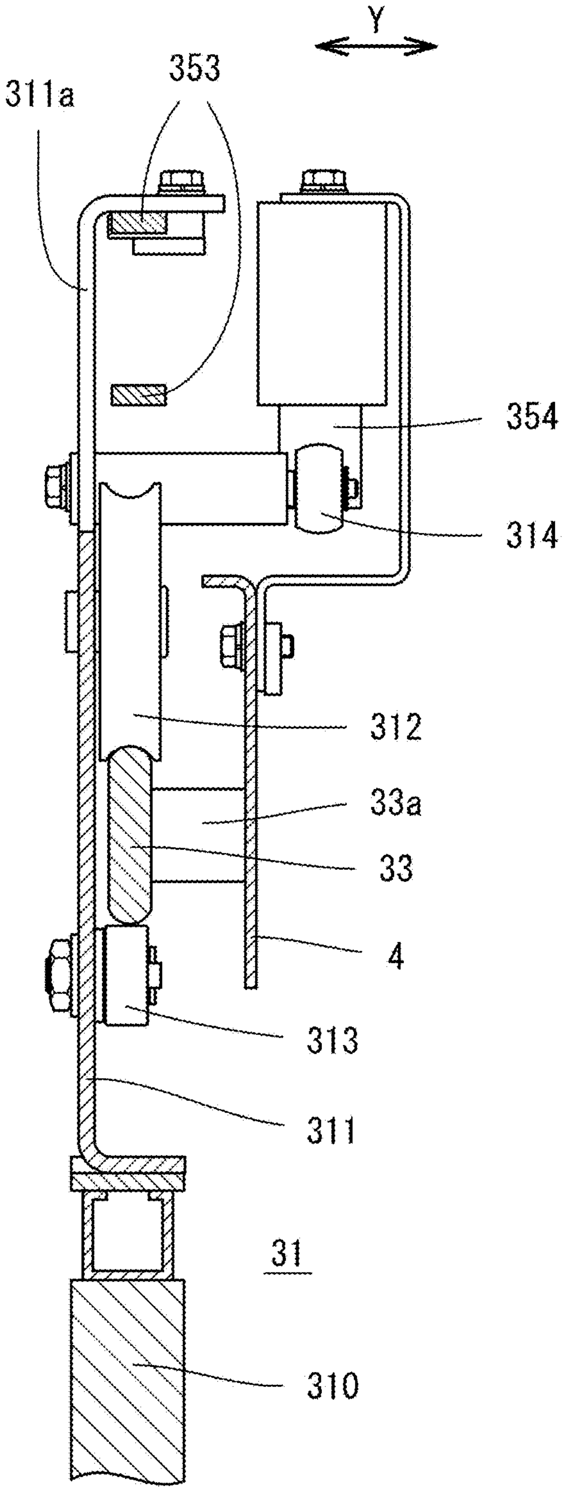
FIG. 5A is a cross-sectional view along line A in FIG. 3.
Figure 5B:
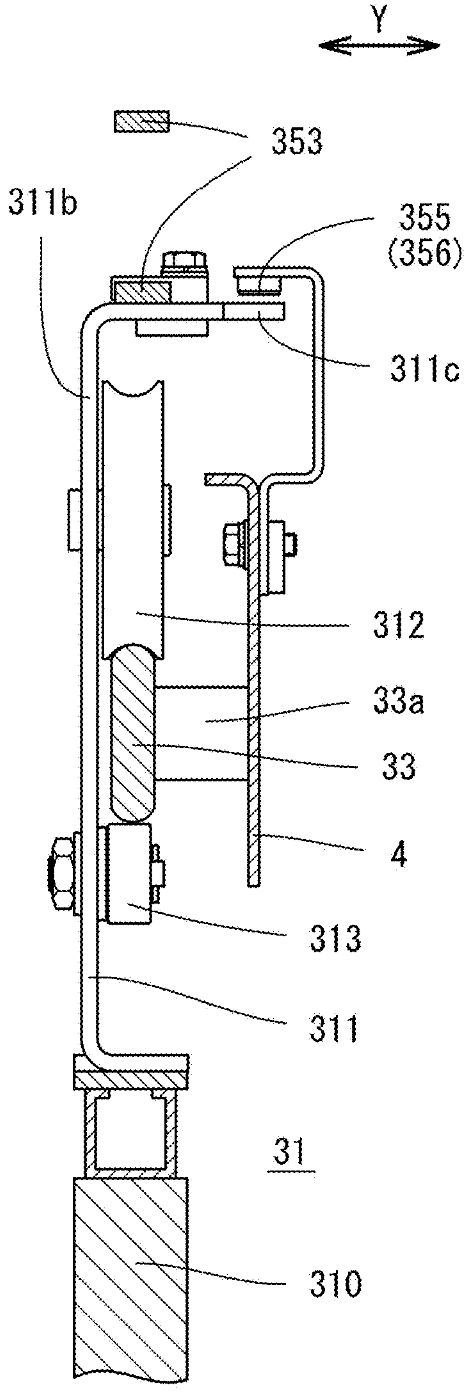
FIG. 5B is a cross-sectional view along line B in FIG. 3.

As shown in FIG. 5A and FIG. 5B, the upper end portions of the extension part 311*a* and the extension part 311*b* are bent. The bent portion is a portion that protrudes rearward (or forward), and is a portion arranged along the horizontal plane. One side of the drive belt 353 is fixed using a fastener in a state of being in contact with the lower face (or upper face) of the bent portion of the extension part 311*a*. The other side of the drive belt 353 is fixed using a fastener in a state of being in contact with the upper face (or lower face) of the bent portion of the extension part 311*b*.

The roller 312 is rotatably attached to the inner face (of the first member) of the door hanger 311. The roller 313 is rotatably attached to the inner face (of the second member) of the door hanger 311. The roller 312 is in contact with the upper edge of the door rail 33. The roller 313 is in contact with the lower edge of the door rail 33. The door rail 33 is attached to the front face of a support frame 4 via legs 33*a*. The door rail 33 is provided in parallel to the support frame 4 on the front face of the support frame 4. The leg 33*a* is a columnar member, and multiple legs 33*a* are provided to be spaced apart appropriately in the left-right direction and attached to the front face of the support frame 4.

In one car door 31, a switch operating member 314 is attached to the inner face (of the first member) of the door hanger 311. The switch operating member 314 includes a roller and turns on a switch 354 when the car door 31 is in a closed state. In the other car door 31, (the bent portion of) the extension part 311*b* of the door hanger 311 includes a detection piece 311*c*. The detection piece 311*c* is a detection piece for a limit switch 355 and a limit switch 356.

As shown in FIG. 6A to FIG. 6D, the support frame 4 is a plate-shaped member that is straight, long in the left-right direction, flat, and has a rectangular shape. The support frame 4 is provided in the left-right direction on the upper portion of the front face of the car 3, along the upper edge of the opening 3*a* of the car 3, with both ends extending to the left and right beyond the upper edge of the opening 3*a*. The support frame 4 is a member for attaching and supporting various components which will be described later. The support frame 4 has rigidity that does not easily deform and is, for example, a metal member including iron, steel, stainless steel, or aluminum as the material.

The support frame 4 includes a main body part 40 and a front protrusion part 41. The main body part 40 is a portion that occupies the majority of the entire support frame 4, and is a plate-shaped portion that is straight, long in the left-right direction, flat, rectangular, and arranged along the vertical plane. The front protrusion part 41 is a portion that protrudes forward from the upper edge of the main body part 40, and is a plate-shaped portion that is straight, long in the left-right direction, flat, rectangular, and arranged along the horizontal plane. The front protrusion part 41 has an upper face 41*a*. The upper face 41*a* is a horizontal face. The main body part 40 and the front protrusion part 41 are integrally provided. As an example, the main body part 40 and the front protrusion part 41 are formed by bending the upper end portion of a single plate material forward.

The support frame 4 has a smaller height dimension compared to the support frames in related art. Thus, the upper edge of the support frame 4 (the upper edge of the main body part 40 and the edge related to the upper face 41*a* of the front protrusion part 41; hereinafter, the same when referred to as "the upper edge of the support frame") is positioned lower than the uppermost portion of the roller 312 with a height difference H.

The support frame 4 is attached to the upper portion of the front face of the car 3. As an example, the support frame 4 is attached to the upper portion of the front face of the car 3 via brackets 50 and appropriate brackets 50A (FIG. 6C). The upper portion of the front face of the car 3 includes a recessed part 3*b* that is recessed in the depth direction, and the support frame 4 is arranged in front of the recessed part 3*b*. Thus, the support frame 4 faces the back face of the recessed part 3*b* with a gap, and an open space S is formed above the support frame 4. The open space S is a space between the front offset plane and the rear offset plane with reference to the vertical plane (of the main body part 40) of the support frame 4. The open space S becomes the arrangement space for various components which will be described later. The brackets 50 are attached to both end portions of the support frame 4. The brackets 50A are combined with the brackets 50 and attached to the outer face of the car 3. As a result, the support frame 4 is fixed to the upper portion of the front face of the car 3.

Figure 6A:
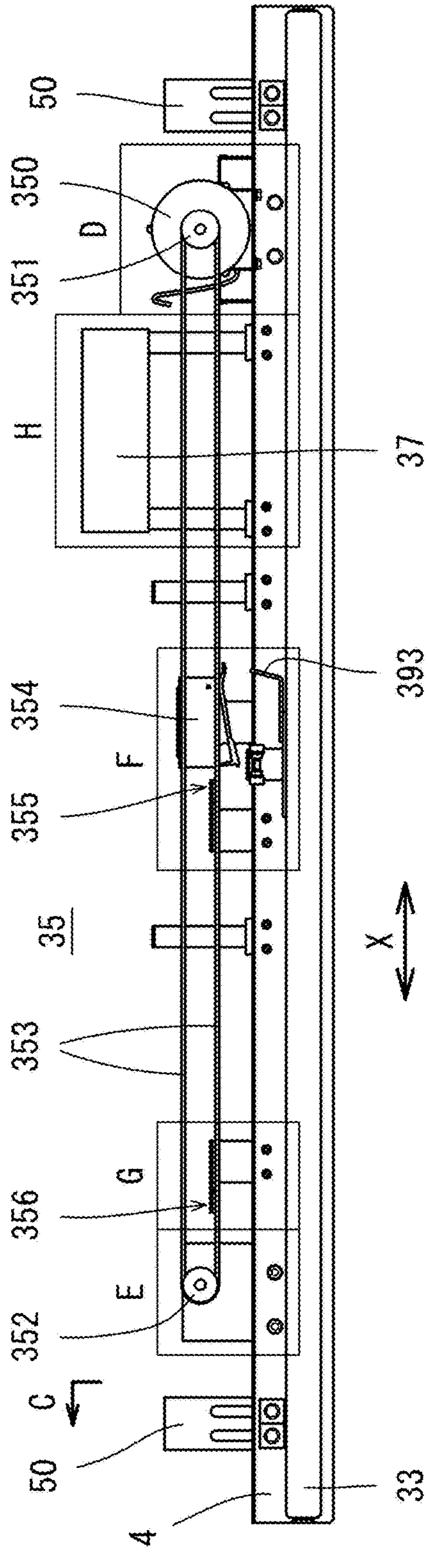
FIG. 6A is a front view of the upper portion of the car with the car door removed.
Figure 6D:
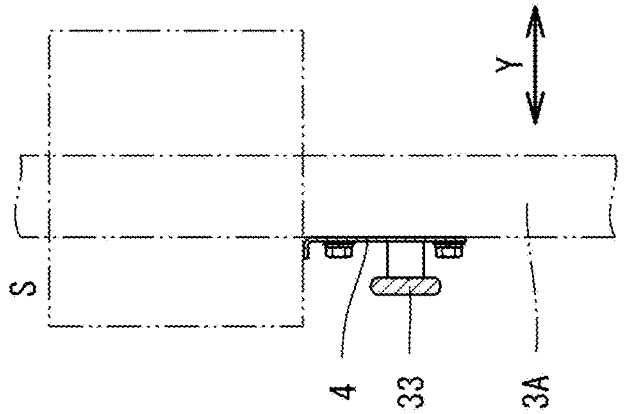
FIG. 6D is an explanatory view related to another example of FIG. 6C.
Figure 6C:
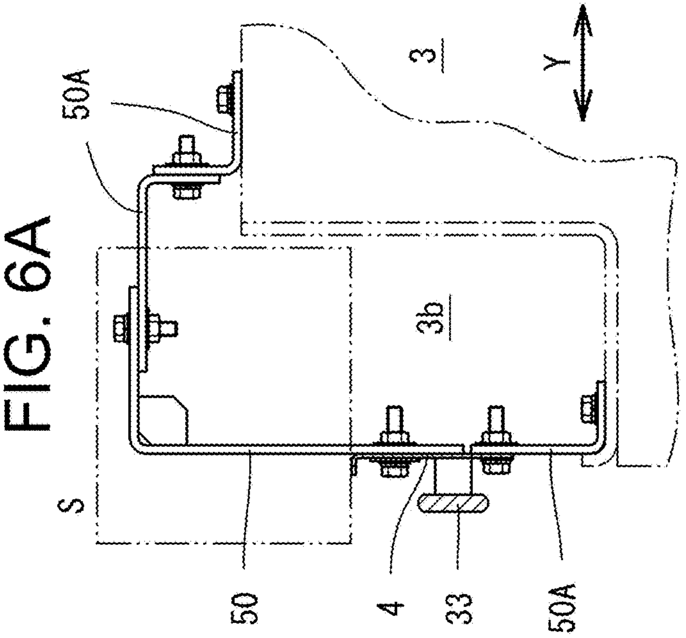
FIG. 6C is a cross-sectional view along line C in FIG. 6A.
Figure 6B:
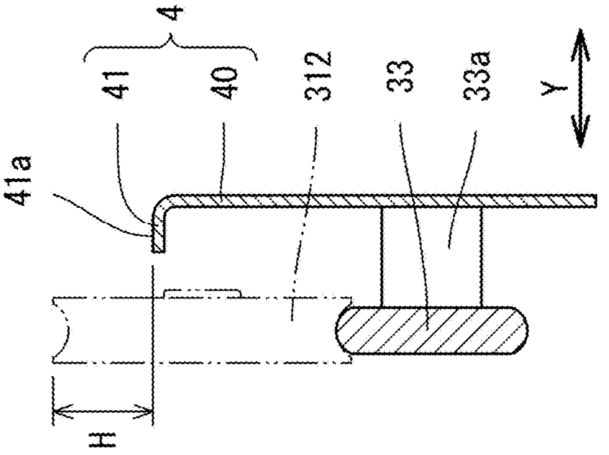
FIG. 6B is a cross-sectional view along line C in FIG. 6A.
Figure 7A:
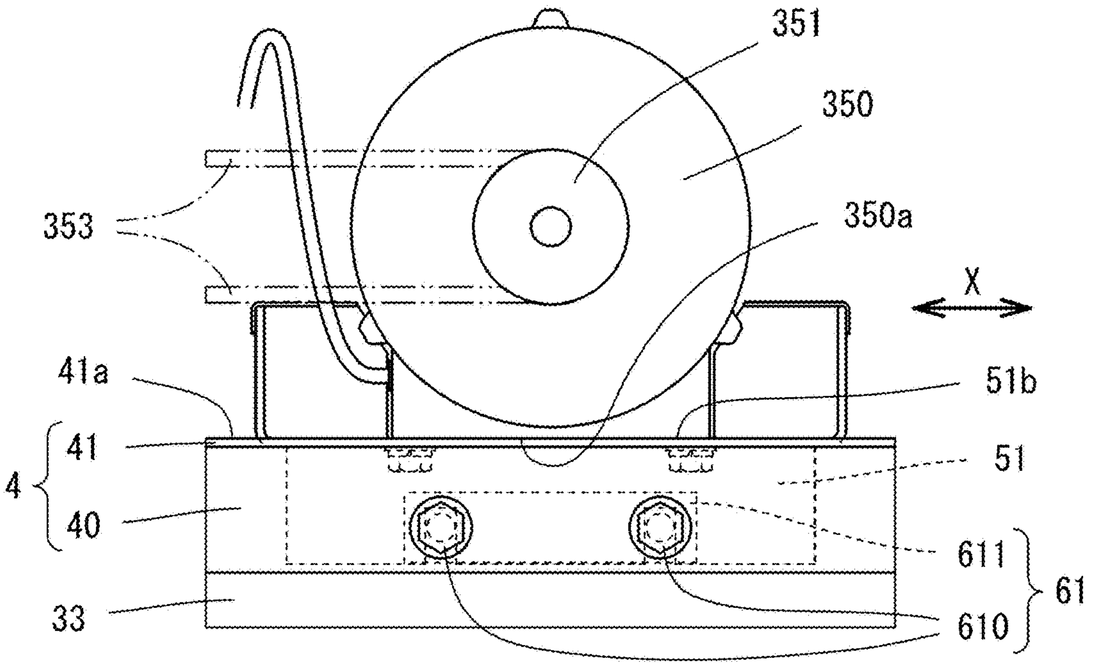
FIG. 7A is a front view of portion D in FIG. 6A.
Figure 7B:
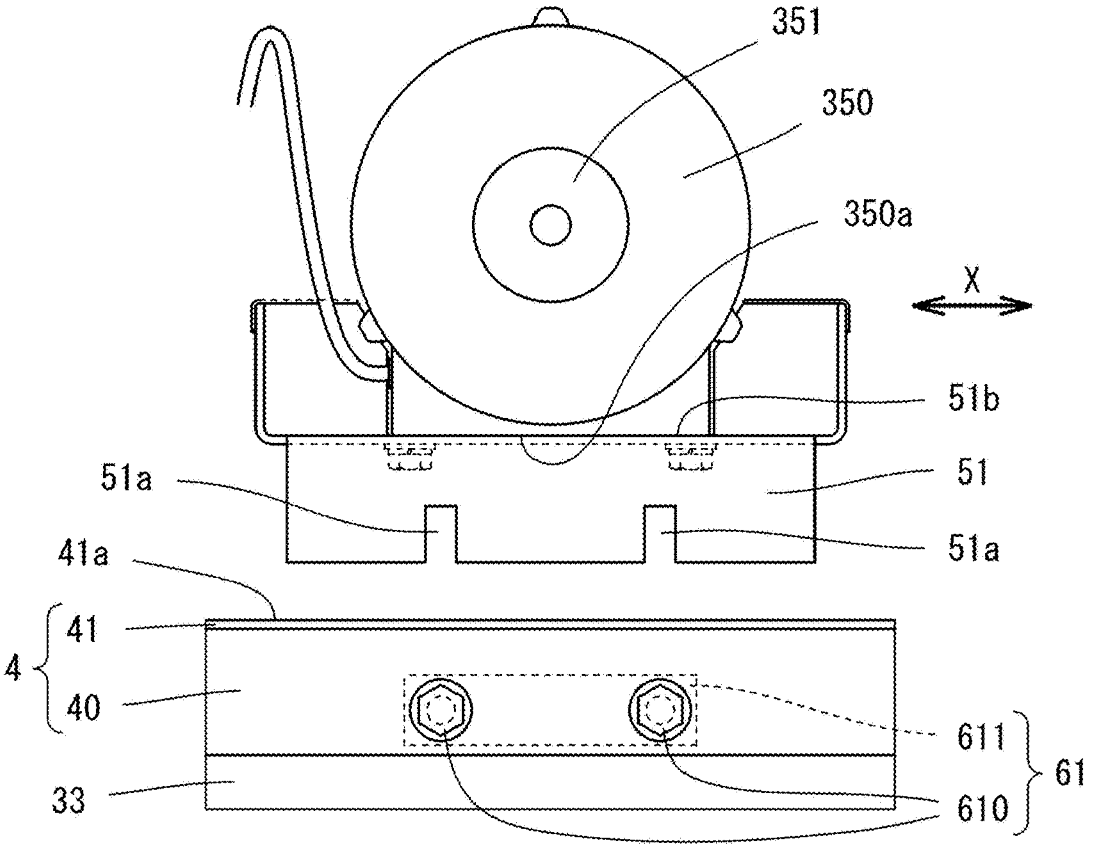
FIG. 7B is an exploded view of FIG. 7A.
Figure 8A:
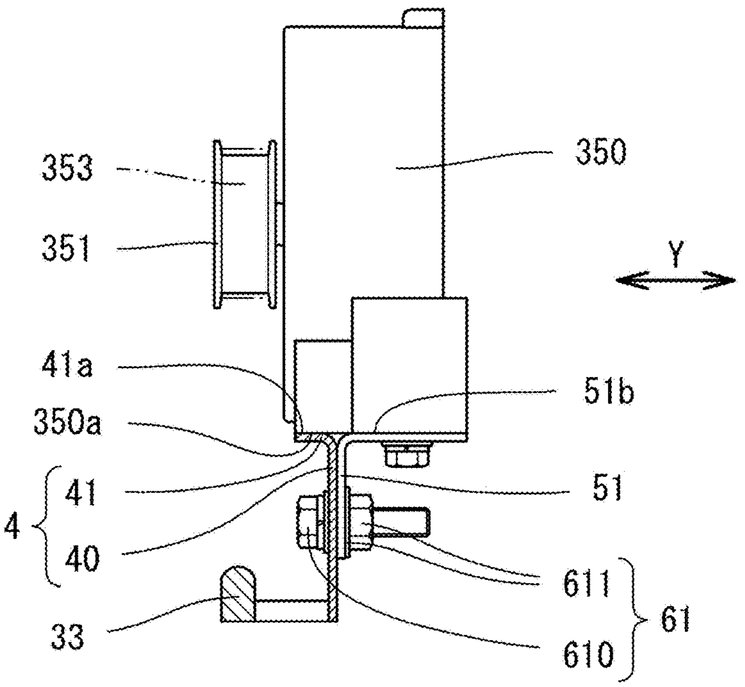
FIG. 8A is a side view of FIG. 7A.
Figure 8B:
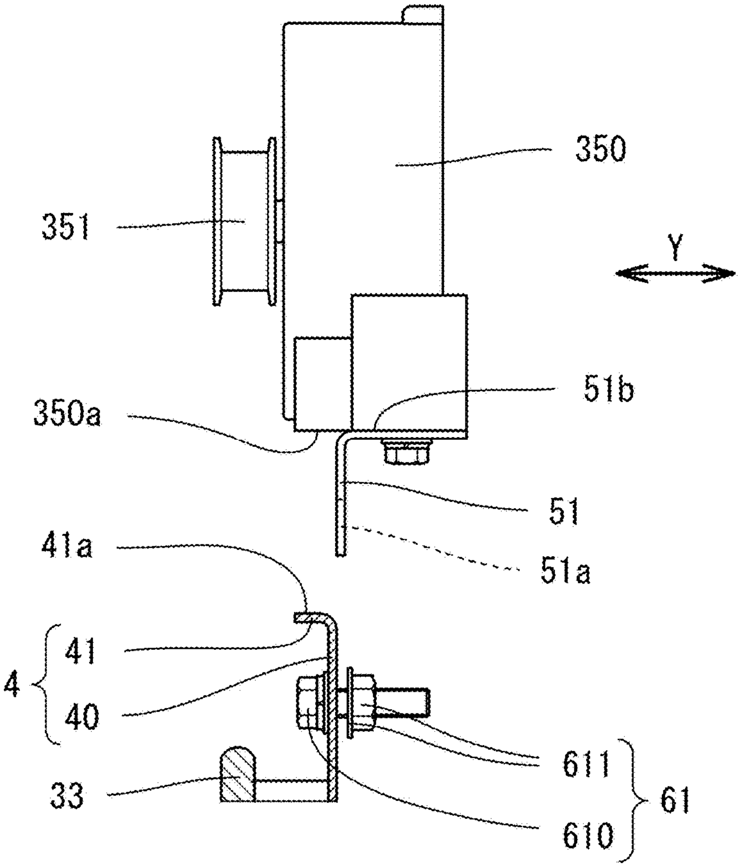
FIG. 8B is an exploded view of FIG. 8A.
Figure 9A:
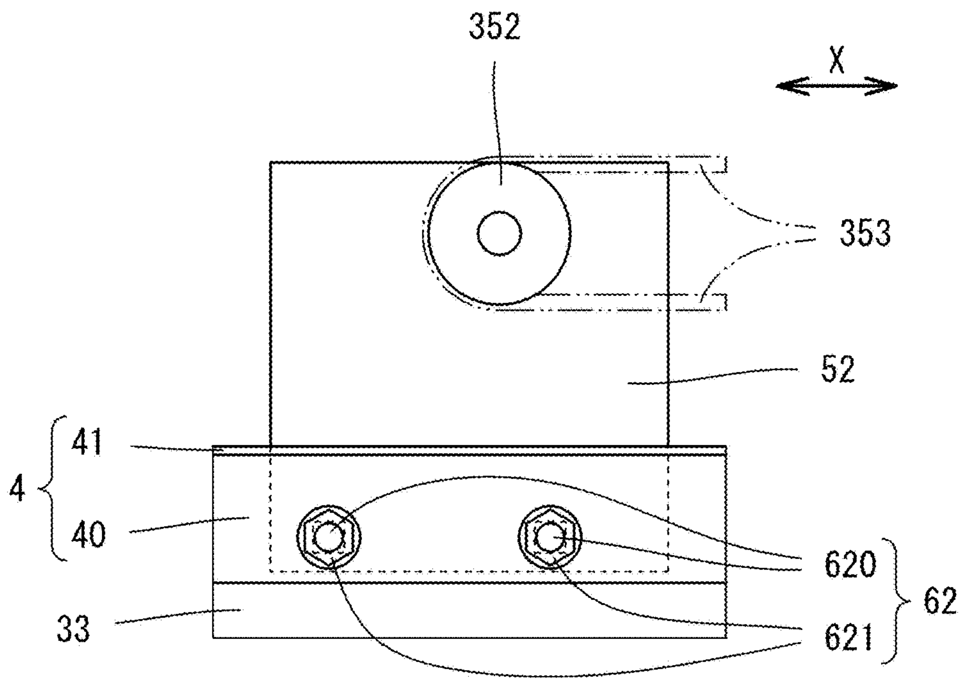
FIG. 9A is a front view of portion E in FIG. 6A.
Figure 9B:
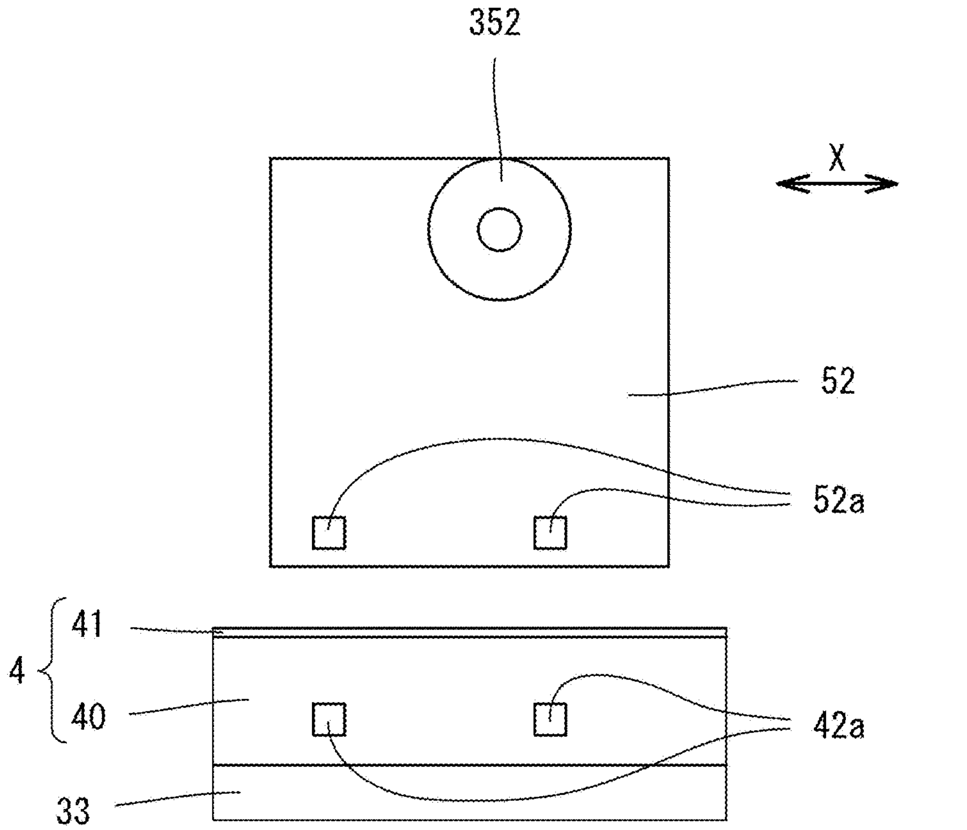
FIG. 9B is an exploded view of FIG. 9A.
Figure 10A:
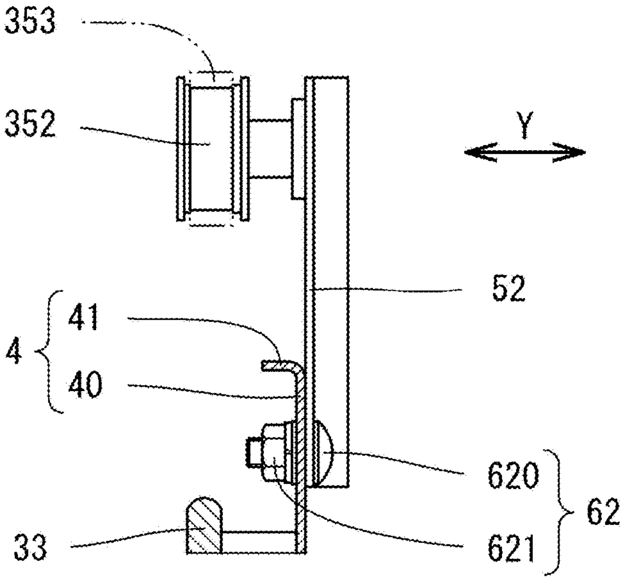
FIG. 10A is a side view of FIG. 9A.
Figure 10B:
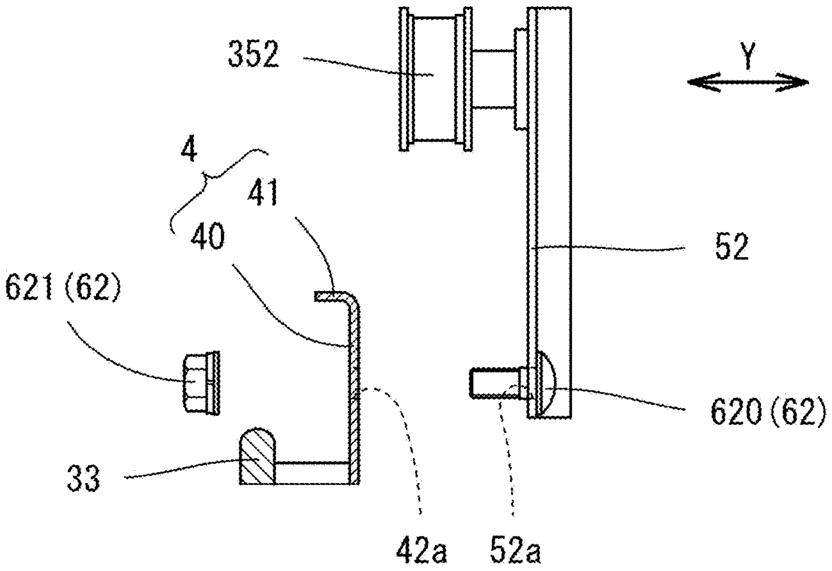
FIG. 10B is an exploded view of FIG. 10A.

As another example, the support frame 4 is attached to the upper portion of the front face of the car 3 via front frames 3A of the car 3 (FIG. 6D). The front frames 3A are provided as a pair on both sides of the car 3, and the support frame 4 is arranged straddling the pair of front frames 3A. Thus, the support frame 4 faces the front face of the car 3 with a gap, and a similar open space S is formed above the support frame 4. The support frame 4 is attached to the pair of front frames 3A at both ends. As a result, the support frame 4 is fixed to the upper portion of the front face of the car 3.

Various components such as the drive motor 350 (and the drive pulley 351), the idler pulley 352, the switch 354, the limit switch 355, and the limit switch 356 of the door opening/closing device 35 are attached to appropriate locations of the support frame 4. In addition, a control box 37 is attached to an appropriate location of the support frame 4 as another component. These various components are attached to the support frame 4 via brackets. The brackets are provided at multiple locations on the upper edge of the support frame 4, and extend and protrude upward, rearward, or forward from the upper edge of the support frame 4. Thus, the various components are arranged in the open space S. The brackets supporting the switch 354, the limit switch 355, and the limit switch 356 are arranged between the bracket supporting the drive motor 350 (and the drive pulley 351) and the bracket supporting the idler pulley 352, but of course, these brackets are provided so as not to interfere with the drive belt 353. The brackets have rigidity that does not easily deform and are, for example, metal members including iron, steel, stainless steel, or aluminum as the material.

As shown in FIG. 7A, FIG. 7B, FIG. 8A, and FIG. 8B, a bracket 51 supporting the drive motor 350 and the drive pulley 351 is attached to the rear face (back face) (of the main body part 40) of the support frame 4. The bracket 51 is detachably attached to (the main body part 40 of) the support frame 4 using a fastener 61. The fastener 61 is a bolt and nut fastener. The fastener 61 is a combination of two bolts 610 and one plate nut (a plate with two nuts welded thereto) 611 (including appropriate washers, spring washers, etc. as needed). (The upper end portion of) (the main body part 40 of) the support frame 4 has a round hole as the insertion hole for the shaft portion of the bolt 610. (The lower end portion of) the bracket 51 has a notched hole 51*a* that opens at the lower edge as the insertion hole for the shaft portion of the bolt 610. The bolt 610 is inserted into the insertion holes of the support frame 4 and the bracket 51 from the front of the support frame 4 and is screwed into the plate nut 611. Thus, the fastener 61 can be fixed and released by a rotational operation from the front of the support frame 4. Then, the insertion hole of the bracket 51 is the notched hole 51*a*. Thus, the bracket 51 is lifted upward and removed in a state where the fastener 61 is loosened.

The bracket 51 is formed by bending a plate material. The bent portion is a portion that protrudes rearward, and is a portion arranged along the horizontal plane. The bent portion has an upper face 51*b*. The upper face 51*b* is a face visible from the front of the support frame 4 and is a horizontal face. The bracket 51 is attached to the support frame 4 so that the upper face 51*b* is close to the upper face 41*a* (of the front protrusion part 41) of the support frame 4 and is at the same height position as (flush with) the upper face 41*a*.

The drive motor 350 has a base face (lower face) 350*a* and is attached to the bracket 51 so that the base face 350*a* is in contact with the upper edge of the support frame 4. Then, the drive motor 350 is attached to the bracket 51 so that the base face 350*a* straddles and contacts the upper face 41*a* of the support frame 4 and the upper face 51*b* of the bracket 51.

The drive motor 350 is attached to the bracket 51 in a manner that allows position adjustment in the front-rear direction (to the extent of the gap between the shaft portion of the bolt and the insertion hole). Then, the drive motor 350 is attached to the bracket 51 so that the tip of the base face 350*a* aligns with the tip of the upper face 41*a* of the support frame 4.

As shown in FIG. 9A, FIG. 9B, FIG. 10A, and FIG. 10B, a bracket 52 supporting the idler pulley 352 is attached to the rear face (of the main body part 40) of the support frame 4. The bracket 52 is detachably attached to (the main body part 40 of) the support frame 4 using a fastener 62. The fastener 62 is a bolt and nut fastener. The fastener 62 is a combination of two square root bolts 620 and two nuts 621 (including appropriate washers, spring washers, etc. as needed). (The upper end portion of) (the main body part 40 of) the support frame 4 has a square hole 42*a* as the insertion hole for the shaft portion of the square root bolt 620. (The lower end portion of) the bracket 52 has a square hole 52*a* as the insertion hole for the shaft portion of the square root bolt 620. The square root bolt 620 is inserted into the insertion holes of the bracket 52 and the support frame 4 from the rear of the support frame 4, and the nut 621 is screwed on from the front of the support frame 4. Thus, the fastener 62 can be fixed and released by a rotational operation from the front of the support frame 4. Then, the square root portion with a square cross-section of the square root bolt 620 fits into the square hole 42*a* and the square hole 52*a*. Thus, the movement and rotation of the bracket 52 relative to the support frame 4 in the vertical plane are restricted.

The bracket 52 is formed using a plate material. The idler pulley 352 is rotatably attached to the bracket 52. Although not shown, the idler pulley 352 is attached to the bracket 52 in a manner that allows position adjustment in the left-right direction. By adjusting the position of the idler pulley 352 in the left-right direction, the tension of the drive belt 353 is adjusted.

As shown in FIG. 11A, FIG. 11B, FIG. 12A, and FIG. 12B, a bracket 54 supporting the switch 354 is attached to the rear face (of the main body part 40) of the support frame 4. The bracket 54 is detachably attached to (the main body part 40 of) the support frame 4 using a fastener 64. The fastener 64 is a bolt and nut fastener. The fastener 64 is a combination of two bolts 640 and one plate nut 641 (including appropriate washers, spring washers, etc. as needed). (The upper end portion of) (the main body part 40 of) the support frame 4 has an elongated hole 44*a* as the insertion hole for the shaft portion of the bolt 640. (The lower end portion of) the bracket 54 has an elongated hole 54*a* as the insertion hole for the shaft portion of the bolt 640. The elongated hole 44*a* is an elongated hole that is long in either the left-right direction or the up-down direction (in the example shown, the up-down direction). The elongated hole 54*a* is an elongated hole that is long in the other direction (in the example shown, the left-right direction). The bolt 640 is inserted into the insertion holes of the support frame 4 and the bracket 54 from the front of the support frame 4 and is screwed into the plate nut 641. Thus, the fastener 64 can be fixed and released by a rotational operation from the front of the support frame 4. Then, the insertion holes of the support frame 4 and the bracket 54 are the elongated hole 44*a* and the elongated hole 54*a* that are long in directions perpendicular to each other (the left-right direction and the up-down direction). This allows the position of the bracket 54 to be adjusted in the left-right direction and the up-down direction relative to the support frame 4.

The bracket 54 is formed by bending a plate material at multiple locations. The bracket 54 is formed so that the switch 354 is arranged behind the drive belt 353. The bent portion formed in the middle section of the bracket 54 is a portion that protrudes rearward and is a portion arranged along the horizontal plane. The bent portion has an upper face 54*b*. The upper face 54*b* is a face visible from the front of the support frame 4 and is a horizontal face. The bracket 54 is attached to the support frame 4 so that the upper face 54*b* is close to the upper face 41*a* (of the front protrusion part 41) of the support frame 4 and is at the same height position as (flush with) the upper face 41*a*.

The switch 354 is attached to the bracket 54 in a manner that allows position adjustment in the front-rear direction and the left-right direction (to the extent of the gap between the shaft portion of the bolt and the insertion hole). The position adjustment of the switch 354 in the up-down direction is performed by adjusting the position of the bracket 54 in the up-down direction so that the upper face 54*b* of the bracket 54 is at the same height position as the upper face 41*a* of the support frame 4.

The switch 354 is a switch detecting that the car door 31 is at the closed position. The switch 354 includes a switch piece 354*a*. The switch piece 354*a* is pivotally provided on the lower face of the main body part of the switch 354, and when the car door 31 is in the closed state, the switch operating member 314 of the car door 31 comes into contact with the switch piece 354*a*, thereby pushing the switch piece 354*a* upward and turning the switch 354 ON. The switch 354 is in the form of an interlock switch that constitutes a part of the safety circuit of the drive device of the elevator 1.

As shown in FIG. 11A, FIG. 11B, FIG. 13A, and FIG. 13B, a bracket 55 supporting the limit switch 355 is attached to the rear face (of the main body part 40) of the support frame 4. The bracket 55 is detachably attached to (the main body part 40 of) the support frame 4 using a fastener 65. The fastener 65 is a bolt and nut fastener. The fastener 65 is a combination of two bolts 650 and one plate nut 651 (including appropriate washers, spring washers, etc. as needed). (The upper end portion of) (the main body part 40 of) the support frame 4 has an elongated hole 45*a* as the insertion hole for the shaft portion of the bolt 650. (The lower end portion of) the bracket 55 has an elongated hole 55*a* as the insertion hole for the shaft portion of the bolt 650. The elongated hole 45*a* is an elongated hole that is long in either the left-right direction or the up-down direction (in the example shown, the up-down direction). The elongated hole 55*a* is an elongated hole that is long in the other direction (in the example shown, the left-right direction). The bolt 650 is inserted into the insertion holes of the support frame 4 and the bracket 55 from the front of the support frame 4 and is screwed into the plate nut 651. Thus, the fastener 65 can be fixed and released by a rotational operation from the front of the support frame 4. Then, the insertion holes of the support frame 4 and the bracket 55 are the elongated hole 45*a* and the elongated hole 55*a* that are long in directions perpendicular to each other (the left-right direction and the up-down direction). This allows the position of the bracket 55 to be adjusted in the left-right direction and the up-down direction relative to the support frame 4.

The bracket 55 is formed by bending a plate material at multiple locations. The bent portion formed in the middle section of the bracket 55 is a portion that protrudes rearward and is a portion arranged along the horizontal plane. The bent portion has an upper face 55*b*. The upper face 55*b* is a face visible from the front of the support frame 4 and is a horizontal face. The bracket 55 is attached to the support frame 4 so that the upper face 55*b* is close to the upper face 41*a* (of the front protrusion part 41) of the support frame 4 and is at the same height position as (flush with) the upper face 41*a*.

The limit switch 355 is attached to the bracket 55 in a manner that allows position adjustment in the front-rear direction and the left-right direction (to the extent of the gap between the shaft portion of an unillustrated bolt and the insertion hole). The position adjustment of the limit switch 355 in the up-down direction is performed by adjusting the position of the bracket 55 in the up-down direction so that the upper face 55*b* of the bracket 55 is at the same height position as the upper face 41*a* of the support frame 4.

The limit switch 355 is a switch detecting that the car door 31 is at the closed position. As an example, the limit switch 355 is a proximity sensor. Since the role of the limit switch 355 may also be fulfilled by the switch 354, it is possible to omit the limit switch 355.

Figure 14A:
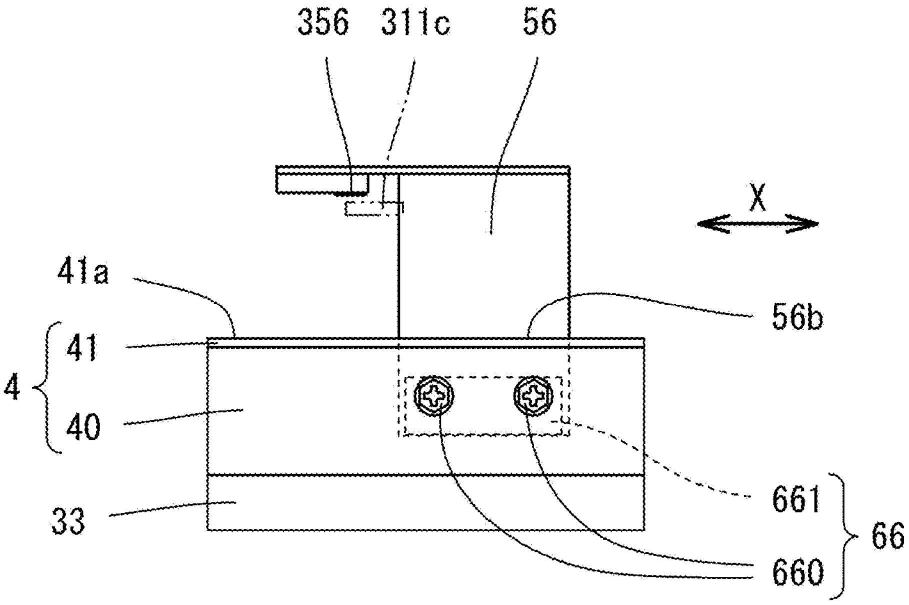
FIG. 14A is a front view of portion G in FIG. 6A.
Figure 14B:
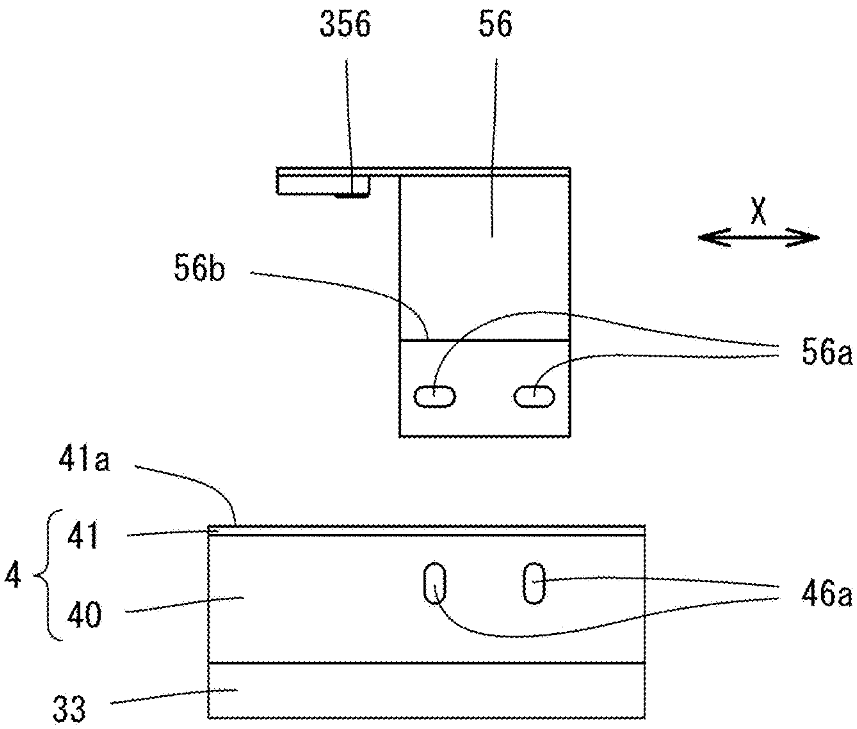
FIG. 14B is an exploded view of FIG. 14A.

As shown in FIG. 14A and FIG. 14B, the limit switch 356 is a switch detecting that the car door 31 is at the opened position. The limit switch 356, the bracket 56 supporting the limit switch 356, the fastener 66, and the fixing structure are substantially the same as the limit switch 355, the bracket 55, the fastener 65, and the fixing structure shown in FIG. 11A, FIG. 11B, FIG. 13A, and FIG. 13B, although they are in a line-symmetrical arrangement relationship. Therefore, the description of the configuration is omitted as the description is the same.

Figure 15:
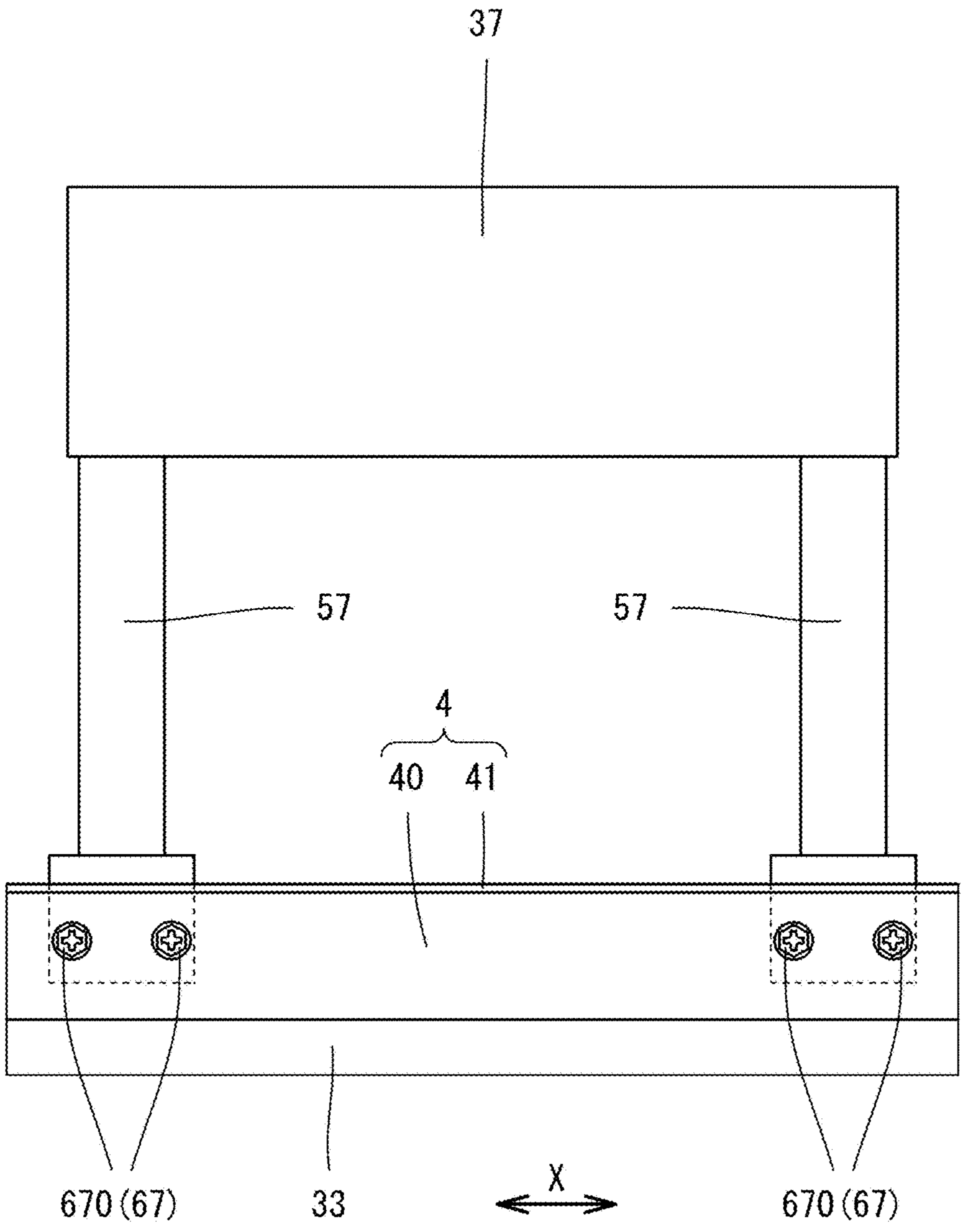
FIG. 15 is a front view of portion H in FIG. 6A.
Figure 16:
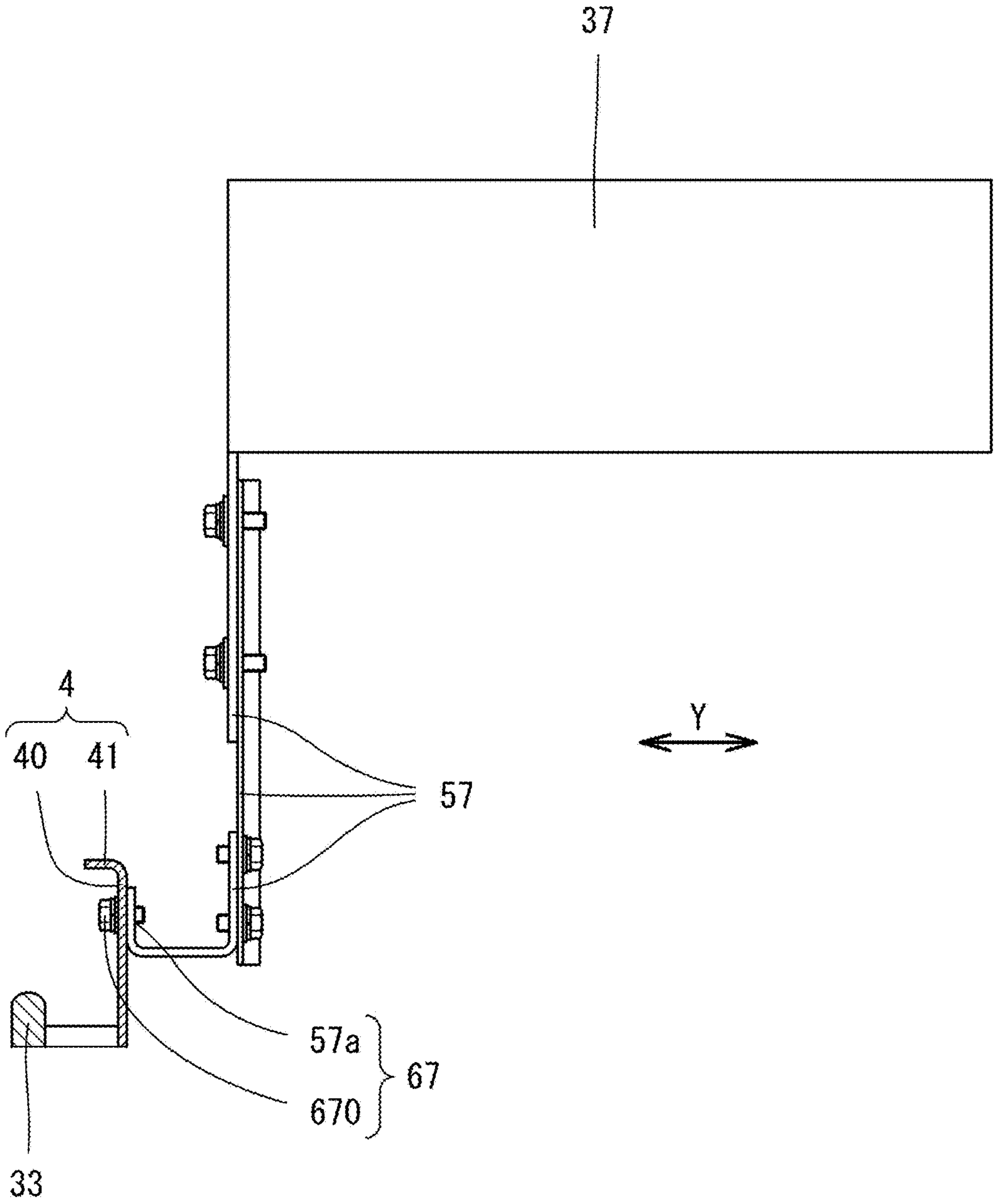
FIG. 16 is a side view of FIG. 15.

As shown in FIG. 15 and FIG. 16, a bracket 57 supporting the control box 37 is attached to the rear face (of the main body part 40) of the support frame 4. The bracket 57 is detachably attached to (the main body part 40 of) the support frame 4 using a fastener 67. The fastener 67 includes two bolts 670 (including appropriate washers, spring washers, etc., as needed). (The upper end portion of) (the main body part 40 of) the support frame 4 has a round hole as the insertion hole for the shaft portion of the bolt 670. (The lower end portion of) the bracket 57 has a threaded hole 57*a* for the bolt 670. The bolt 670 is inserted into the insertion hole of the support frame 4 from the front of the support frame 4 and is screwed into the threaded hole 57*a*. Thus, the fastener 67 can be fixed and released by a rotational operation from the front of the support frame 4.

The control box 37 houses a sub-control part for the control part (main control part) of the entire elevator 1. Alternatively, the control box 37 houses a relay part for the control part of the entire elevator 1. In some cases, the control box 37 may not be provided on the support frame 4.

Figure 17:
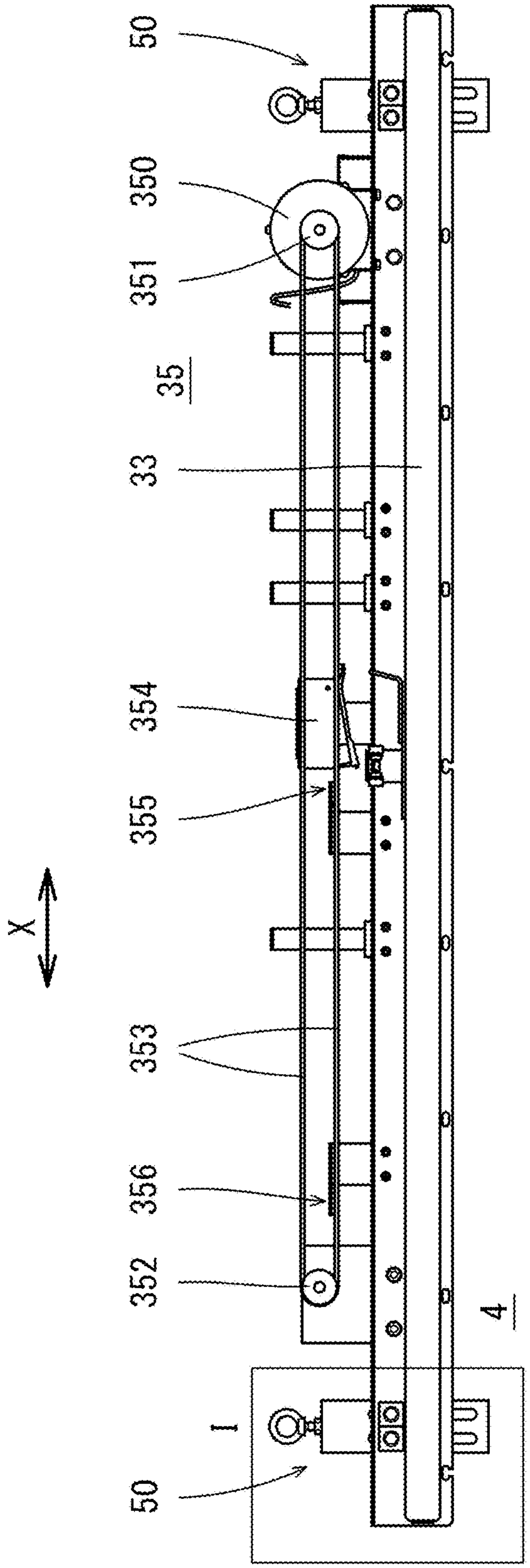
FIG. 17 is a front view of the integrated structure with various components attached to the support frame.
Figure 18A:
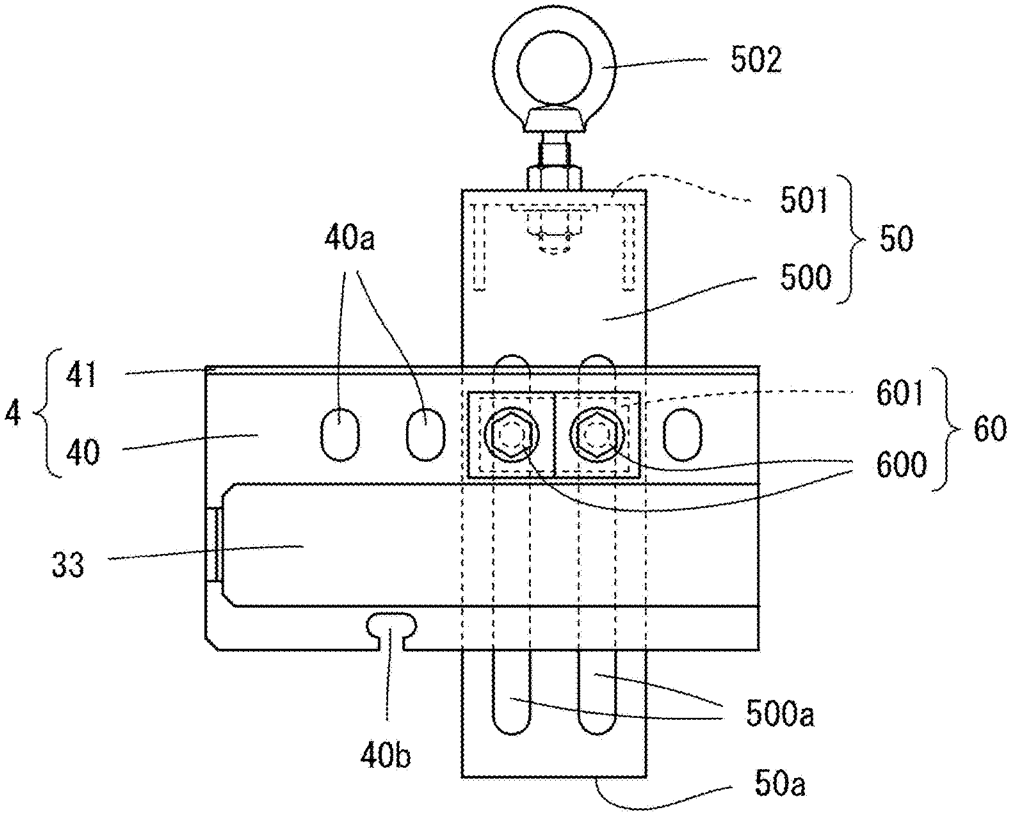
FIG. 18A is a front view of portion I in FIG. 17.
Figure 18B:
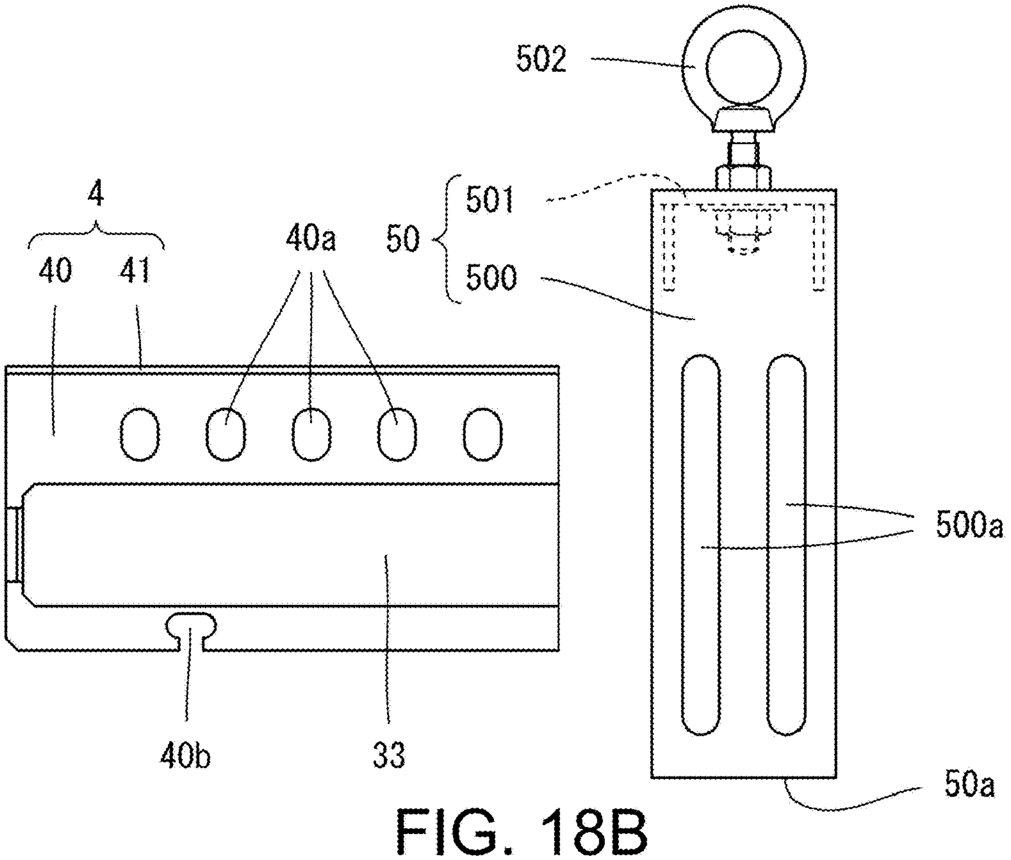
FIG. 18B is an exploded view of FIG. 18A.
Figure 19A:
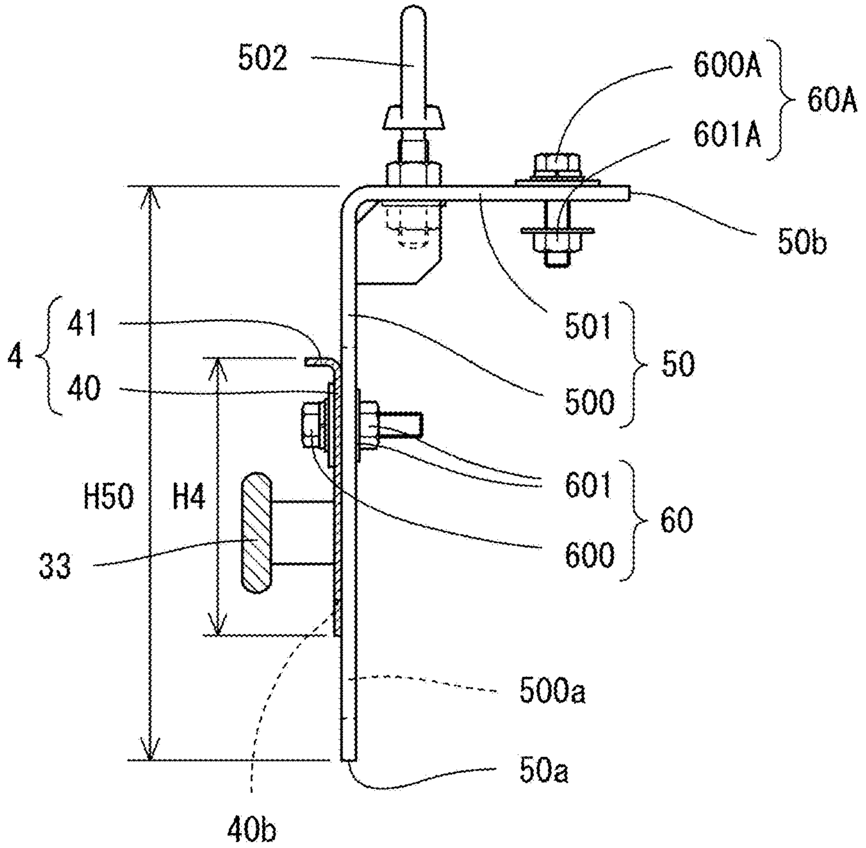
FIG. 19A is a side view of FIG. 18A.
Figure 19B:
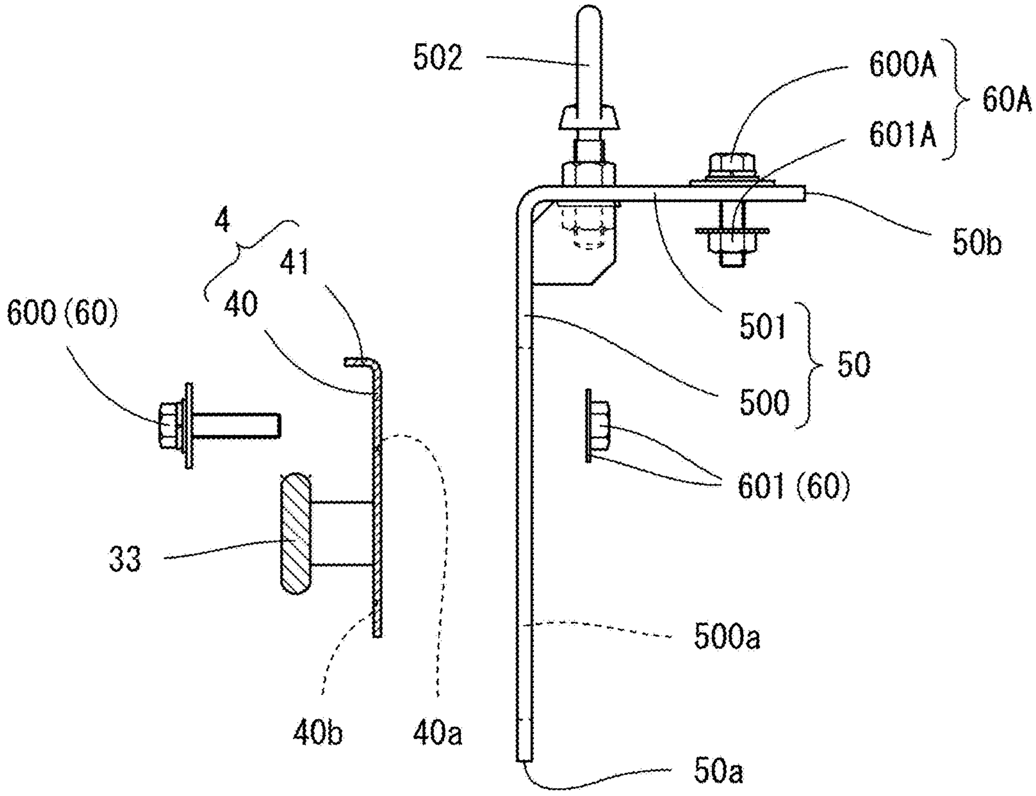
FIG. 19B is an exploded view of FIG. 19A.

FIG. 17 shows an integrated structure (hereinafter simply referred to as "integrated structure") of the door rail 33, the drive motor 350, the drive pulley 351, the idler pulley 352, the switches 354 to 356, and the support frame 4, with everything attached except for the control box 37.

(The support frame 4 of) the integrated structure includes a pair of brackets 50 spaced apart in the left-right direction on the rear face. As an example, the bracket 50 is arranged at each end portion of the support frame 4. The brackets 50 have been described with reference to FIG. 6A to FIG. 6D.

As shown in FIG. 18A, FIG. 18B, FIG. 19A, and FIG. 19B, the bracket 50 includes a main body part 500 and a rear protrusion part 501. The main body part 500 is a plate-shaped portion that is straight, flat, rectangular, and arranged along the vertical plane. The rear protrusion part 501 is a portion that protrudes rearward from the upper edge of the main body part 500, and is a plate-shaped portion that is straight, flat, rectangular, and arranged along the horizontal plane. The main body part 500 and the rear protrusion part 501 are integrally formed. As an example, the main body part 500 and the rear protrusion part 501 are formed in an inverted L-shape by bending the upper portion of a single plate material rearward.

(The main body part 500 of) the bracket 50 has a length H50 in the up-down direction that is longer than a length H4 of (the main body part 40 of) the support frame 4 in the up-down direction. Thus, the bracket 50 protrudes and extends downward from the lower edge of the support frame 4, and a lower end 50*a* (of the main body part 500) of the bracket 50 is positioned at a height lower than the lower edge of the support frame 4. Additionally, the bracket 50 protrudes and extends upward from the upper edge of the support frame 4, and a tip 50*b* (of the rear protrusion part 501) of the bracket 50 is positioned at a height higher than the upper edge of the support frame 4.

The bracket 50 is attached to the rear face (of the main body part 40) of the support frame 4. The bracket 50 is detachably attached to (the main body part 40 of) the support frame 4 using a fastener 60. The fastener 60 is a bolt and nut fastener. The fastener 60 is a combination of two bolts 600 and two nuts 601 (including appropriate washers, spring washers, etc., as needed). (The upper end portion of) (the main body part 40 of) the support frame 4 has through holes 40*a* as the insertion holes for the shaft portions of the bolts 600. Multiple through holes 40*a* are provided in a row in the left-right direction, and two appropriate through holes 40*a* are selected. (The main body part 500 of) the bracket 50 has slide elongated holes 500*a* that are long in the up-down direction as the insertion holes for the shaft portions of the bolts 600. Two slide elongated holes 500*a* are provided in a row in the left-right direction. The two slide elongated holes 500*a* are in a left-right symmetrical arrangement relationship centered on the center line of the width of (the main body part 500 of) the bracket 50 in the left-right direction. Each of the two slide elongated holes 500*a* is formed to be longer than the length H4 of the support frame 4 in the up-down direction. The bolt 600 is inserted into the insertion holes of the support frame 4 and the bracket 50 from the front of the support frame 4 and is screwed into the nut 601. Thus, the fastener 60 can be fixed and released by a rotational operation from the front of the support frame 4. Then, the insertion hole of the bracket 50 is the slide elongated hole 500*a*. This allows the bracket 50 to be repositioned and slidable in the up-down direction in a state where the fastener 60 is loosened.

The bracket 50 includes an eye bolt 502 as an engaged part for a suspension tool. The eye bolt 502 is provided at a location on the rear protrusion part 501 that is behind the center of gravity of the integrated structure. The eye bolt 502 is provided to protrude upward from the upper face of the rear protrusion part 501.

The bracket 50 includes a fastener 60A at the end portion of the rear protrusion part 501. The fastener 60A is a bolt and nut fastener, and is a combination of one bolt 600A and one nut 601A. The fastener 60A is for fixing the bracket 50 and the bracket 50A (FIG. 6C).

(The lower end portion of) (the main body part 40 of) the support frame 4 has notched holes 40*b* that open at the lower edge. Multiple notched holes 40*b* are appropriately spaced apart in the left-right direction along the entire length of the support frame 4. The notched hole 40*b* is used as the insertion hole for the shaft portion of the bolt 600A of the fastener 60A that is for fixing the support frame 4 and the separate bracket 50A (FIG. 6C).

Figure 20A:
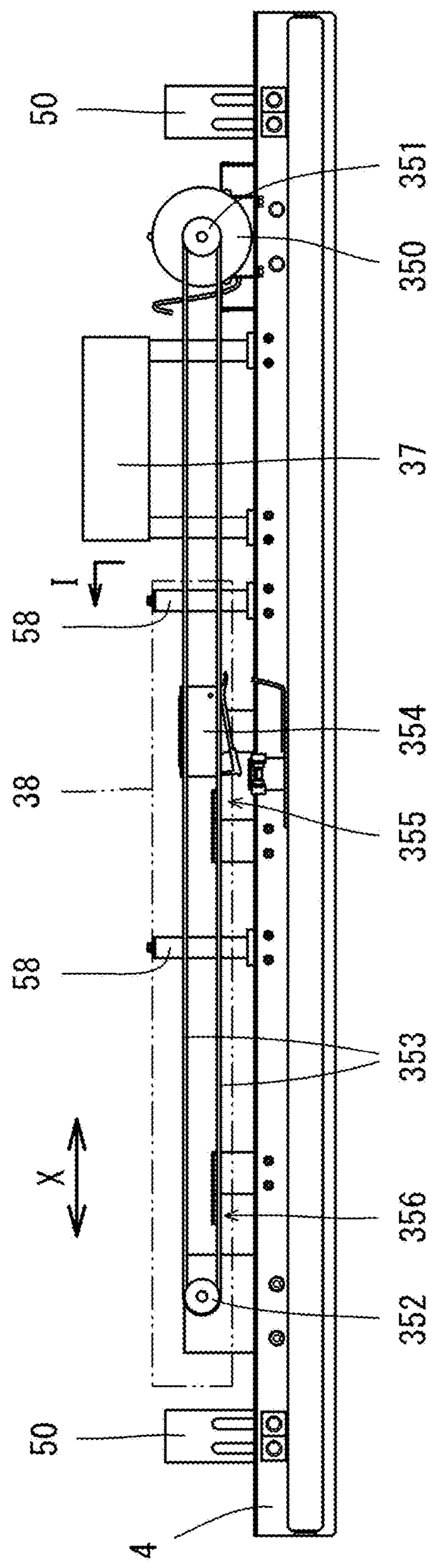
FIG. 20A is a modification example of FIG. 6A.
Figure 20B:
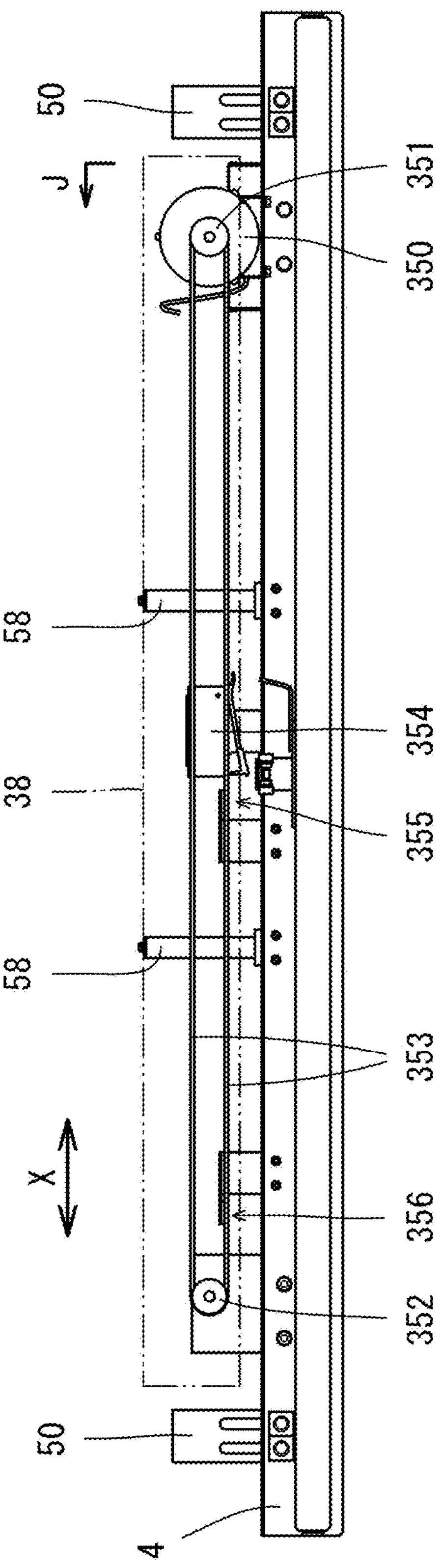
FIG. 20B is another example of FIG. 20A.
Figure 21A:
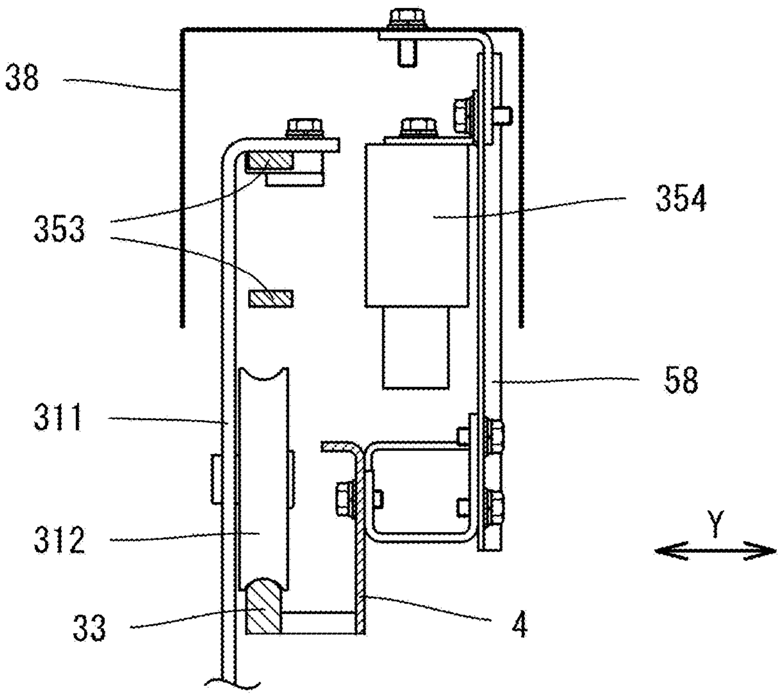
FIG. 21A is a cross-sectional view along line I in FIG. 20A.
Figure 21B:
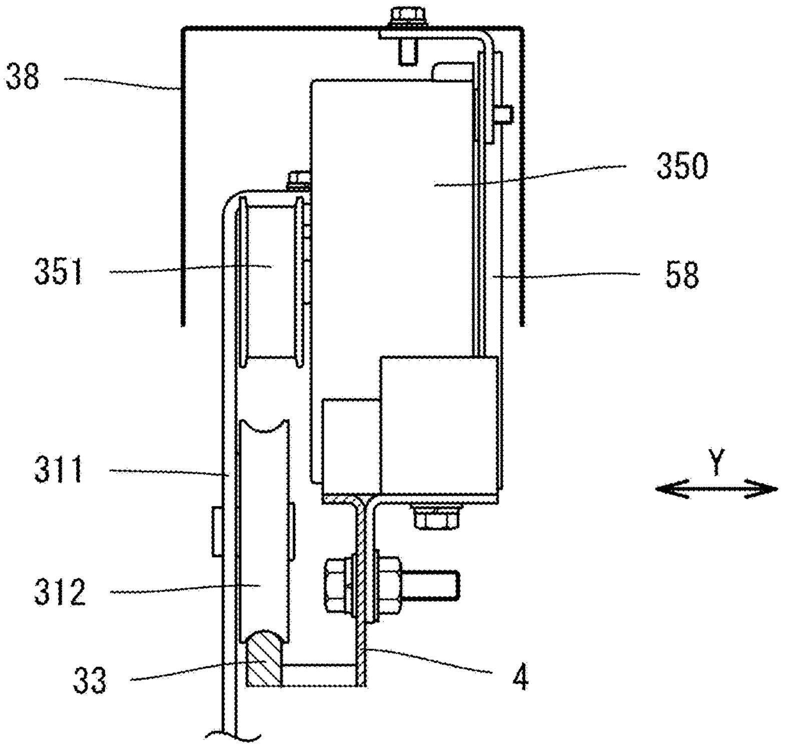
FIG. 21B is a cross-sectional view along line J in FIG. 20B.
Figure 22A:
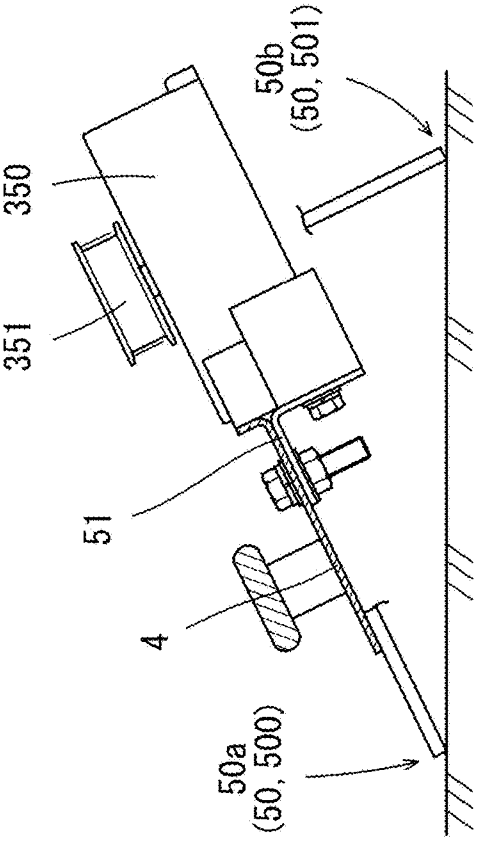
FIG. 22A is an explanatory view when the bracket is used as a base.
Figure 22B:
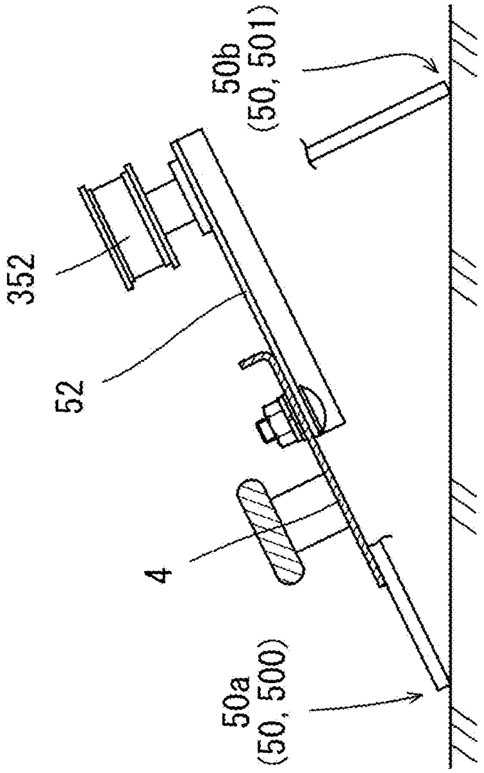
FIG. 22B is an explanatory view when the bracket is used as a base.
Figure 22C:
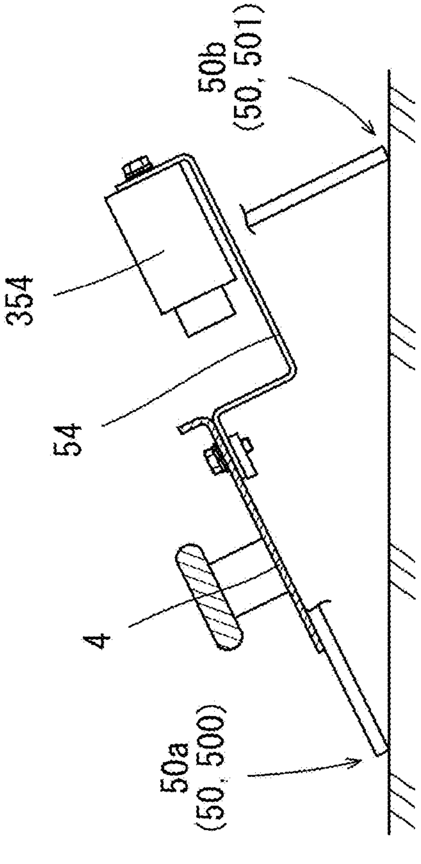
FIG. 22C is an explanatory view when the bracket is used as a base.
Figure 22D:
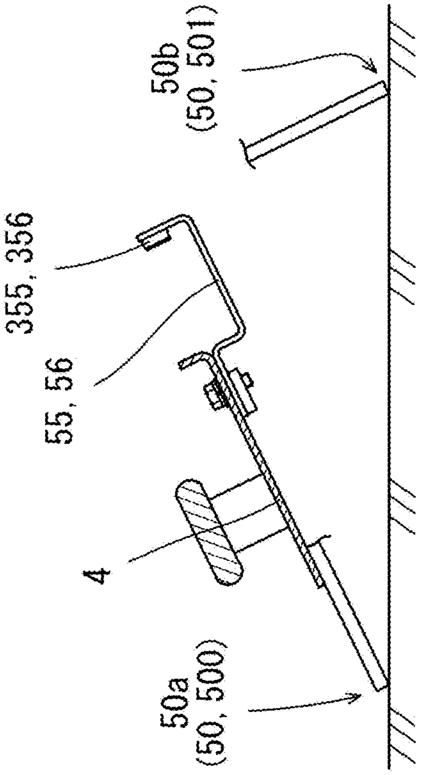
FIG. 22D is an explanatory view when the bracket is used as a base.

As shown in FIG. 20A, FIG. 20B, FIG. 21A, and FIG. 21B, the support frame 4 includes a cover 38. The cover 38 covers a part or entirety of the open space S in the left-right direction from the front, rear, and above. Thus, the switch 354, the limit switch 355, the limit switch 356, and the idler pulley 352 are covered by the cover 38 (FIG. 20A). Alternatively, the drive motor 350, the drive pulley 351, the switch 354, the limit switch 355, the limit switch 356, and the idler pulley 352 are covered by the cover 38 (FIG. 20B). In both cases, the upper portion of the car door 31 (the upper portion of the door hanger 311) and the drive belt 353 are also covered by the cover 38.

The bracket 58 supporting the cover 38, the fastener, and the fixing structure are the same as the bracket 57, the fastener 67, and the fixing structure shown in FIG. 15 and FIG. 16. Therefore, the description of the configuration is omitted as the description is the same.

As shown in FIG. 3 and FIG. 4, the car door device 30 includes a landing door engagement device 39. The landing door engagement device 39 is a device that, when the car doors 31 open (and close), engages with an engaged body (for example, roller) 230 of the landing door 23, thereby causing the landing doors 23 to open (and close) in accordance with the opening (and closing) of the car doors 31. The landing door engagement device 39 includes, as components on the side of the car door 31, a first engagement body 390, a second engagement body 391, and a link 392, and as a component on the entrance side of the car 3, a cam 393.

The first engagement body 390 is fixed. The second engagement body 391 is provided to be movable between a first state (FIG. 3) and a second state (FIG. 4) where the second engagement body 391 is closer to the first engagement body 390 and the gap (width) between the second engagement body 391 and the first engagement body 390 is narrower than in the first state. The link 392 is operatively connected to the second engagement body 391 at one end portion. As shown in FIG. 3, when the car doors 31 are in a closed state, (the roller at) the other end portion of the link 392 comes into contact with the cam 393, thereby displacing the second engagement body 391 from the second state to the first state. Then, as shown in FIG. 4, when the car doors 31 open and the other end portion of the link 392 moves away from the cam 393, the second engagement body 391 is displaced from the first state to the second state due to its own weight.

Figure 11A:
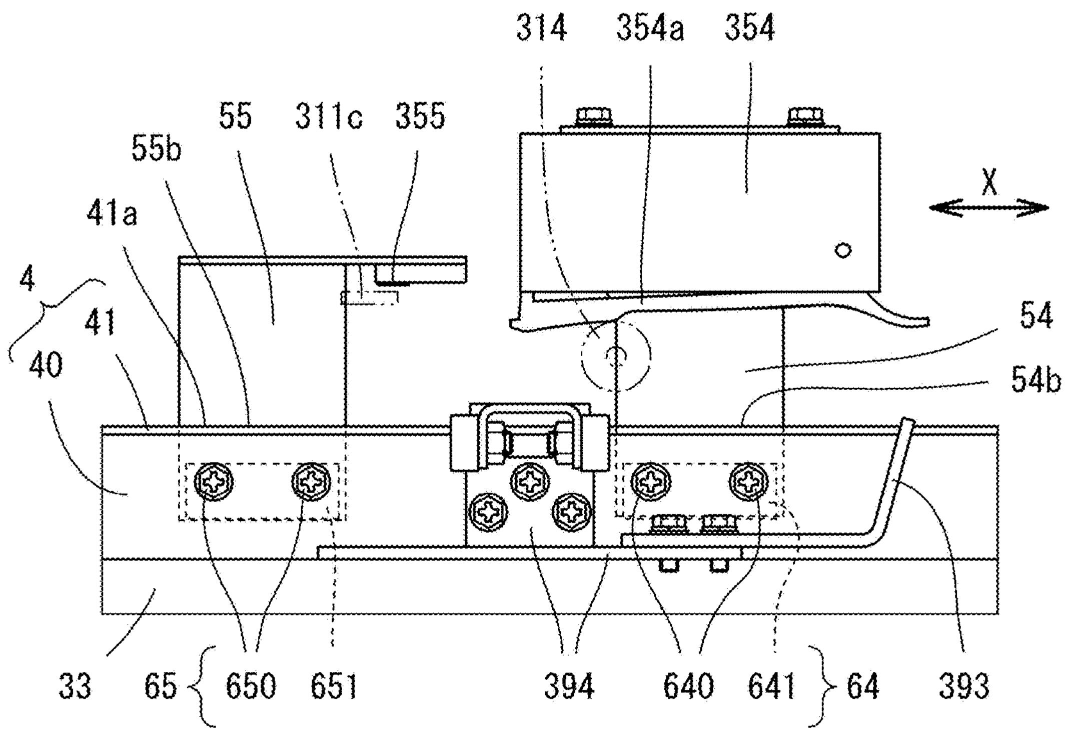
FIG. 11A is a front view of portion F in FIG. 6A.
Figure 11B:
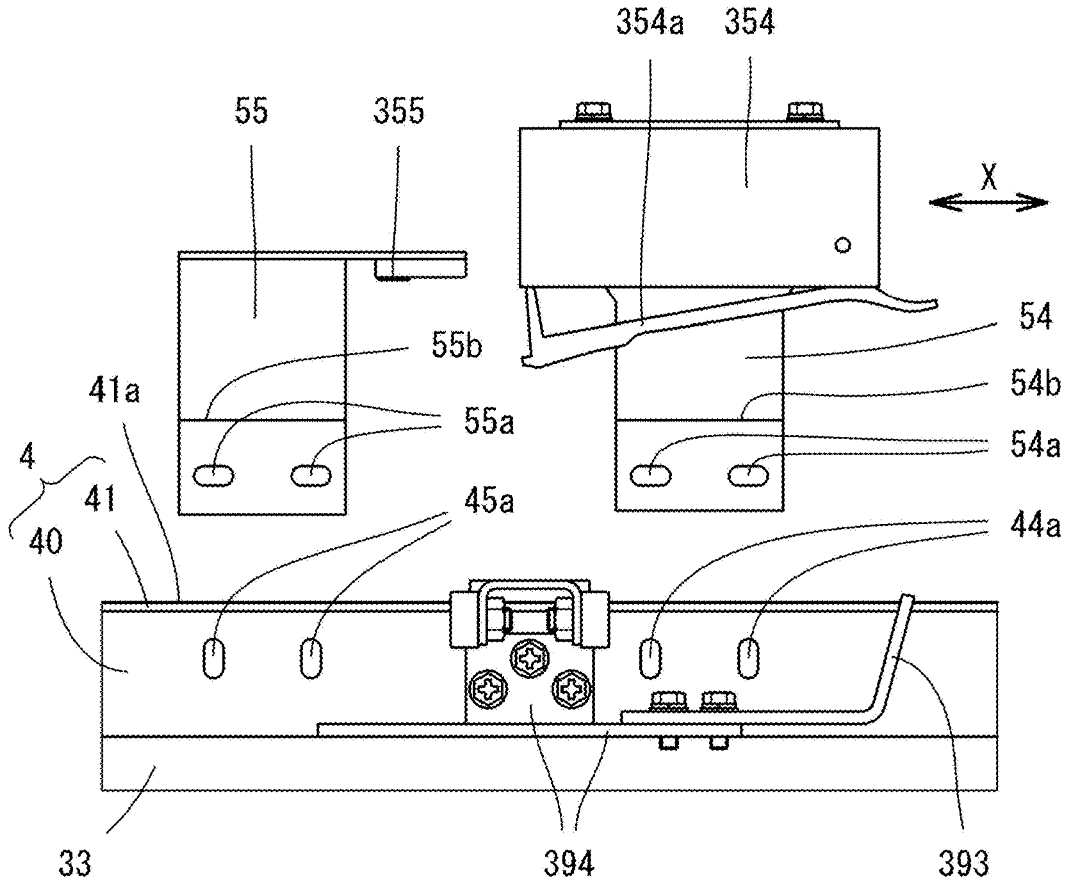
FIG. 11B is an exploded view of FIG. 11A.
Figure 12A:
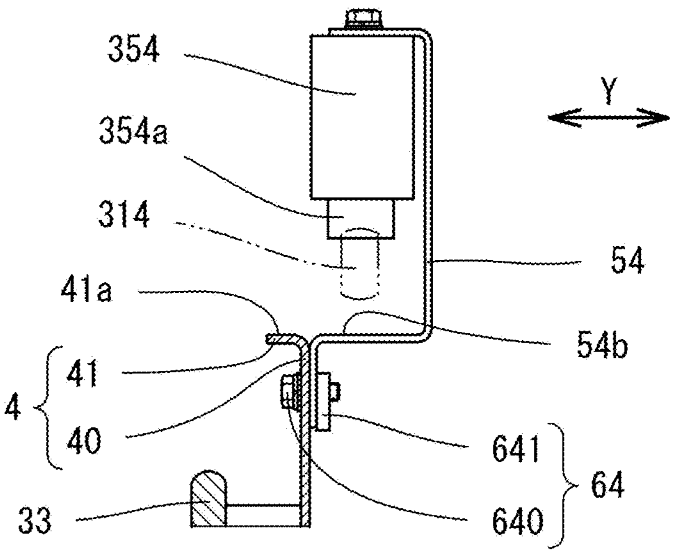
FIG. 12A is a side view of a portion of FIG. 11A.
Figure 12B:
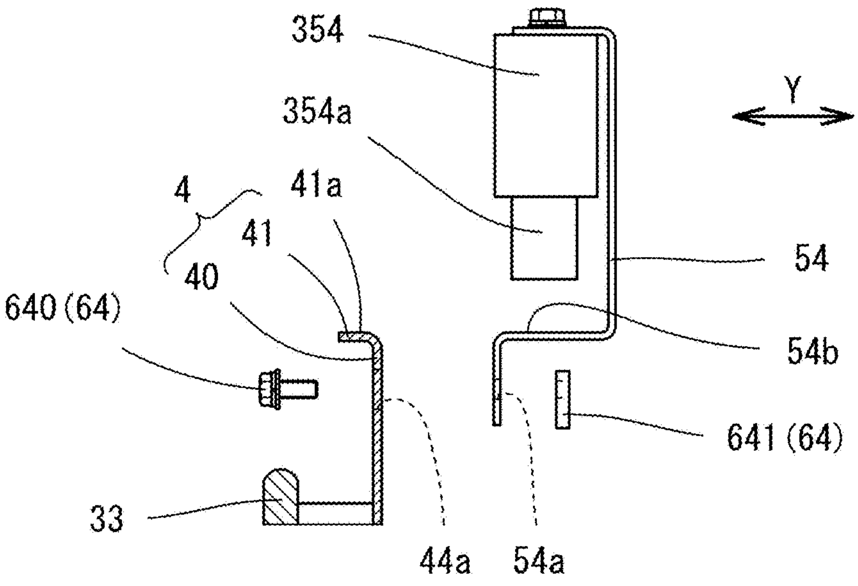
FIG. 12B is an exploded view of FIG. 12A.
Figure 13A:
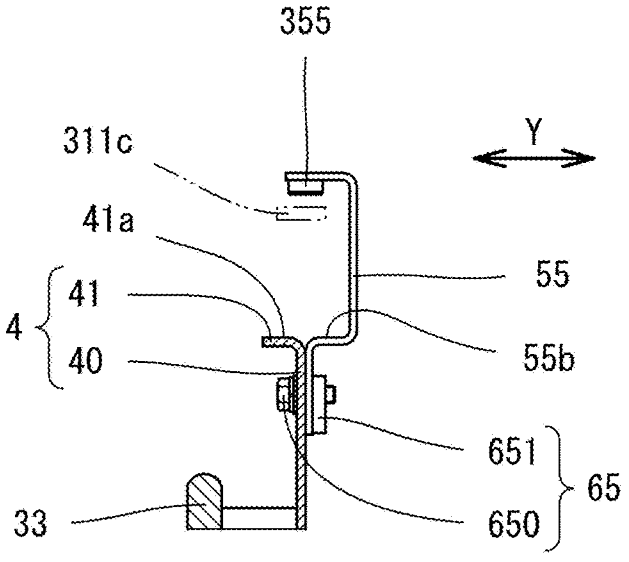
FIG. 13A is a side view of another portion of FIG. 11A.
Figure 13B:
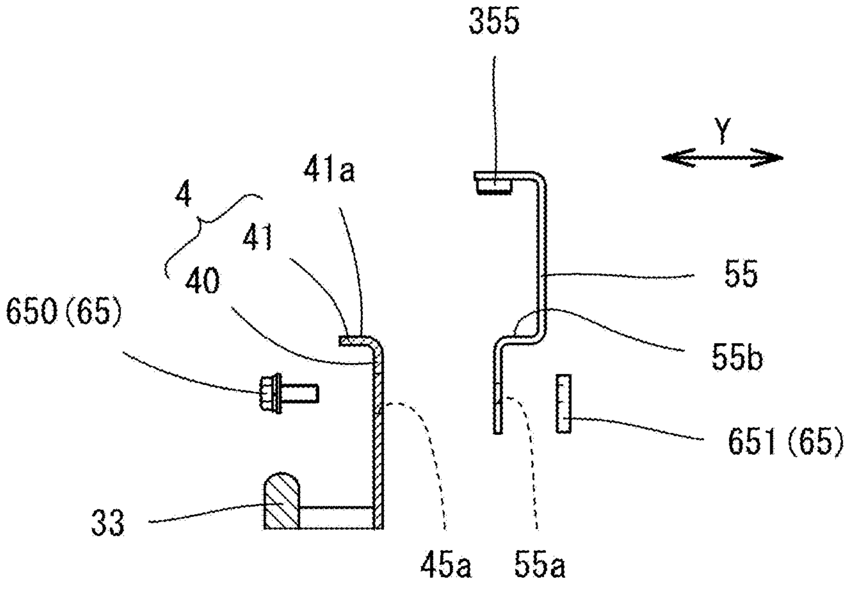
FIG. 13B is an exploded view of FIG. 13A.

As shown in FIG. 11A and FIG. 11B, the cam 393 is attached to the front face of the support frame 4 via a bracket 394 at an intermediate position in the left-right direction of the support frame 4.

The configuration of the elevator 1 according to this embodiment is as described above. According to the elevator 1 of this embodiment, the support frame 4 includes the brackets 51 to 57 at multiple locations along the upper edge, and supports various components such as the drive motor 350 (and the drive pulley 351), the idler pulley 352, the switch 354, the limit switch 355, the limit switch 356, and the control box 37 via the brackets 51 to 57. Thus, there is no need to secure an area on the front face of the support frame 4 to arrange these various components. Therefore, it is possible to reduce the height dimension of the support frame 4, thereby achieving weight reduction for the support frame 4, and consequently, reducing the manufacturing cost of the car 3, improving the work efficiency in installation work, and reducing the operating cost.

Furthermore, according to the elevator 1 of this embodiment, the drive pulley 351 is directly connected to the drive motor 350, and the drive motor 350 is supported on the support frame 4 via the bracket 51. Additionally, the drive motor 350 has the base face 350*a* and is attached to the bracket 51 so that the base face 350*a* is in contact with the upper edge of the support frame 4. As a result, in the system (direct drive system) where the drive belt 353 is directly driven by the drive motor 350, it is possible to bring the height position of the drive belt 353 closer to the roller 312 of the car door 31, and it is possible to suppress the eccentric load (eccentric torque) associated with driving from acting on the car doors 31. Therefore, it is possible to improve the movement stability of the car doors 31 in the left-right direction, and to open and close the car doors 31 smoothly and quietly.

Moreover, according to the elevator 1 of this embodiment, the upper edge of the support frame 4 is positioned lower than the uppermost portion of the roller 312. Thus, it is possible to bring the height position of the drive belt 353 even closer to the roller 312, and it is possible to further suppress the eccentric load (eccentric torque) associated with driving from acting on the car doors 31. Therefore, it is possible to further improve the movement stability of the car doors 31 in the left-right direction, and to open and close the car doors 31 more smoothly and more quietly. Furthermore, it is possible to further reduce the height dimension of the support frame 4, thereby achieving further weight reduction for the support frame 4.

Further, according to the elevator 1 of this embodiment, the support frame 4 is a member that is long in the left-right direction and arranged along the vertical plane, and various components are arranged in the open space S between the front offset plane and the rear offset plane with reference to the vertical plane of the support frame 4, above the support frame 4. Therefore, it is possible to neatly configure the area above the support frame 4.

Additionally, according to the elevator 1 of this embodiment, the cover 38 is provided to cover a part or entirety of the open space S from the front, rear, and above. Therefore, it is possible to prevent dust or the like from accumulating on various components. Moreover, as the area above the support frame 4 is neatly configured, it is possible to make the cover 38 compact.

Furthermore, according to the elevator 1 of this embodiment, the support frame 4 is a member that is long in the left-right direction, and includes the main body part 40 and the front protrusion part 41 that protrudes forward from the upper edge of the main body part 40. Therefore, it is possible to obtain high rigidity even with the downsized support frame 4. Additionally, there is no protrusion part toward the rear, and the back face of the support frame 4 is a flat face. Therefore, the support frame 4 can be easily attached to the structure of the car 3.

Moreover, according to the elevator 1 of this embodiment, the brackets 51 to 58 are attached to the rear face of the main body part 40 of the support frame 4. Therefore, it is possible to neatly configure the front face of the support frame 4.

Further, according to the elevator 1 of this embodiment, the bracket 51 supporting the drive motor 350 has the upper face 51*b* in a part, and is attached to the support frame 4 so that the upper face 51*b* is at the same height position as the upper face 41*a* of the front protrusion part 41 of the support frame 4. The drive motor 350 has the base face 350*a* and is attached to the bracket 51 so that the base face 350*a* straddles and contacts the upper face 41*a* of the front protrusion part 41 and the upper face 51*b* of the bracket 51. Thus, the drive motor 350 is constrained by the two upper faces 41*a* and 51*b* in the rotational direction around the drive shaft. Therefore, even if rotational torque is generated in the drive motor 350 along with the driving of the drive motor 350, it is possible to prevent the drive motor 350 from causing misalignment in the rotational direction.

Additionally, according to the elevator 1 of this embodiment, the drive motor 350 is attached to the bracket 51 so that the tip of the base face 350*a* aligns with the tip of the upper face 41*a* of the front protrusion part 41 of the support frame 4. In other words, when attaching the drive motor 350, the tip of the base face 350*a* and the tip of the upper face 41*a* are used as the reference for positioning the drive motor 350 in the front-rear direction. Therefore, it is possible to improve the workability in attaching the drive motor 350.

Moreover, according to the elevator 1 of this embodiment, the brackets 51 and 54 to 56 supporting the drive motor 350, the switch 354, the limit switch 355, and the limit switch 356 respectively have the upper faces 51*b* and 54*b* to 56*b* in a part and are attached to the support frame 4 so that the upper faces 51*b* and 54*b* to 56*b* are at the same height position as the upper face 41*a* of the front protrusion part 41 of the support frame 4. In other words, when attaching the brackets 51 and 54 to 56, the upper face 41*a* and the upper faces 51*b* and 54*b* to 56*b* are used as the reference for positioning the brackets 51 and 54 to 56 in the up-down direction. Therefore, it is possible to improve the workability in the attachment work.

Furthermore, according to the elevator 1 of this embodiment, the brackets 51 to 58 are attached to the support frame 4 using the fasteners 61 to 68 that can be fixed and released by a rotational operation from the front. Therefore, it is possible to improve the workability in the repair, replacement, and maintenance work when the need arises to repair or replace various components after constructing the elevator 1.

Moreover, according to the elevator 1 of this embodiment, the fastener 61 of the bracket 51 supporting the drive motor 350 is a bolt and nut fastener, and the bracket 51 has the notched hole 51*a* that opens at the lower edge as the insertion hole for the shaft portion of the bolt 610. Thus, the drive motor 350 and the bracket 51 can be lifted upward and removed in a state where the fastener 61 is loosened. Therefore, it is possible to improve the workability in the attachment and removal work.

Additionally, according to the elevator 1 of this embodiment, the fastener 62 of the bracket 52 supporting the idler pulley 352 is a square root bolt and nut fastener, and the support frame 4 and the bracket 52 respectively have the square hole 42*a* and the square hole 52*a* as the insertion holes for the shaft portion of the square root bolt 620. The square root portion of the square root bolt 620 fits into the square hole 42*a* and the square hole 52*a*. Therefore, even if rotational torque is generated in the bracket 52 supporting the idler pulley 352 along with the driving of the drive motor 350, it is possible to prevent the bracket 52 from causing misalignment in the rotational direction.

Moreover, according to the elevator 1 of this embodiment, the fasteners 64 to 66 of the brackets 54 to 56 supporting the switch 354, the limit switch 355, and the limit switch 356 are bolt and nut fasteners. The support frame 4 has the elongated holes 44*a* to 46*a* that are long in either the left-right direction or the up-down direction as the insertion holes for the shaft portions of the bolts 640 to 660, and the brackets 54 to 56 have the elongated holes 54*a* to 56*a* that are long in the other direction as the insertion holes for the shaft portions of the bolts 640 to 660. Therefore, it is possible to adjust or fine-tune the positions of the brackets 54 to 56 in the left-right direction and the up-down direction, and consequently, the positions of the switch 354, the limit switch 355, and the limit switch 356 in the left-right direction and the up-down direction.

Furthermore, according to the elevator 1 of this embodiment, the door hangers 311 of the car doors 31 respectively include the extension part 311*a* and the extension part 311*b* that extend upward, and the car doors 31 are connected to the drive belt 353 by the extension part 311*a* and the extension part 311*b*. Therefore, it is possible to reduce the number of components and reduce the manufacturing cost. In addition, as described above, since the height position of the drive belt 353 becomes closer to the door hanger 311, it is possible to shorten the extension length of the extension part 311*a* and the extension part 311*b*. Therefore, there is no need to take measures such as increasing the thickness of the material to enhance the rigidity of the extension part 311*a* and the extension part 311*b*, and it is possible to achieve weight reduction for the car door 31.

In addition, according to the elevator 1 of this embodiment, the extension part 311*a* and the extension part 311*b* include bent portions that protrude rearward or forward, and the drive belt 353 is fixed using a fastener in a state of being in contact with the lower face or upper face of the bent portion. Therefore, it is possible to simplify the connecting structure between the car door 31 and the drive belt 353.

Furthermore, according to the elevator 1 of this embodiment, the door hanger 311 includes a pair of first members provided to be spaced apart in the left-right direction, and the extension part 311*a* and the extension part 311*b* are formed on the left half portion or the right half portion divided by the center line in the left-right direction of one of the first members. Therefore, it is possible to manufacture and obtain two first members from one material, thereby improving the yield.

Moreover, according to the elevator 1 of this embodiment, the extension part 311*b* includes the detection piece 311*c* for the limit switch 355 and the limit switch 356. Therefore, it is possible to reduce the number of components and reduce the manufacturing cost.

Furthermore, according to the elevator 1 of this embodiment, as shown in FIG. 22A to FIG. 22D, the bracket 50 functions as a base for the support frame 4 by grounding the lower end 50*a* of the main body part 500 and the tip 50*b* of the rear protrusion part 501 on the floor of the building, thereby lifting the support frame 4 off the floor. Therefore, in the installation work of the door opening/closing device 35, it is possible to reduce the consideration for damage to various components of the door opening/closing device 35, such as the door rail 33, the drive motor 350, the drive pulley 351, the idler pulley 352, and the switches 354 to 356.

Moreover, according to the elevator 1 of this embodiment, the rear protrusion part 501 in the bracket 50 is provided to protrude rearward from the upper portion of the main body part 500. Thus, the support frame 4 is inclined so that the support frame 4 is more separated from the floor toward the upper side. Therefore, various components arranged in the open space above the support frame 4 are sufficiently separated from the floor, making it possible to reliably avoid undesirable situations such as hitting the floor.

Additionally, according to the elevator 1 of this embodiment, the bracket 50 has the length H50 in the up-down direction that is longer than the length H4 of the support frame 4 in the up-down direction. Thus, the lower end 50*a* and the tip 50*b* of the bracket 50 reliably make contact with the floor of the building. Therefore, the integrated structure can be placed on the floor in a stable state.

Furthermore, according to the elevator 1 of this embodiment, the bracket 50 is attached to the support frame 4 so as to be changeable in position in the up-down direction. Therefore, it is possible to change the position appropriately for both uses: as a base and as a bracket for fixing the integrated structure to the car 3.

Moreover, according to the elevator 1 of this embodiment, the bracket 50 is attached to the support frame 4 using the fastener 60, and the fastener 60 is a bolt and nut fastener. The bracket 50 has the slide elongated hole 500*a* that is long in the up-down direction as the insertion hole for the shaft portion of the bolt 600. Therefore, it is possible to change the position by sliding the bracket 50 without removing the fastener 60.

Furthermore, according to the elevator 1 of this embodiment, the slide elongated hole 500*a* is formed to be longer than the length H4 of the support frame 4 in the up-down direction. Therefore, it is possible to increase the sliding amount of the bracket 50.

Figure 23:
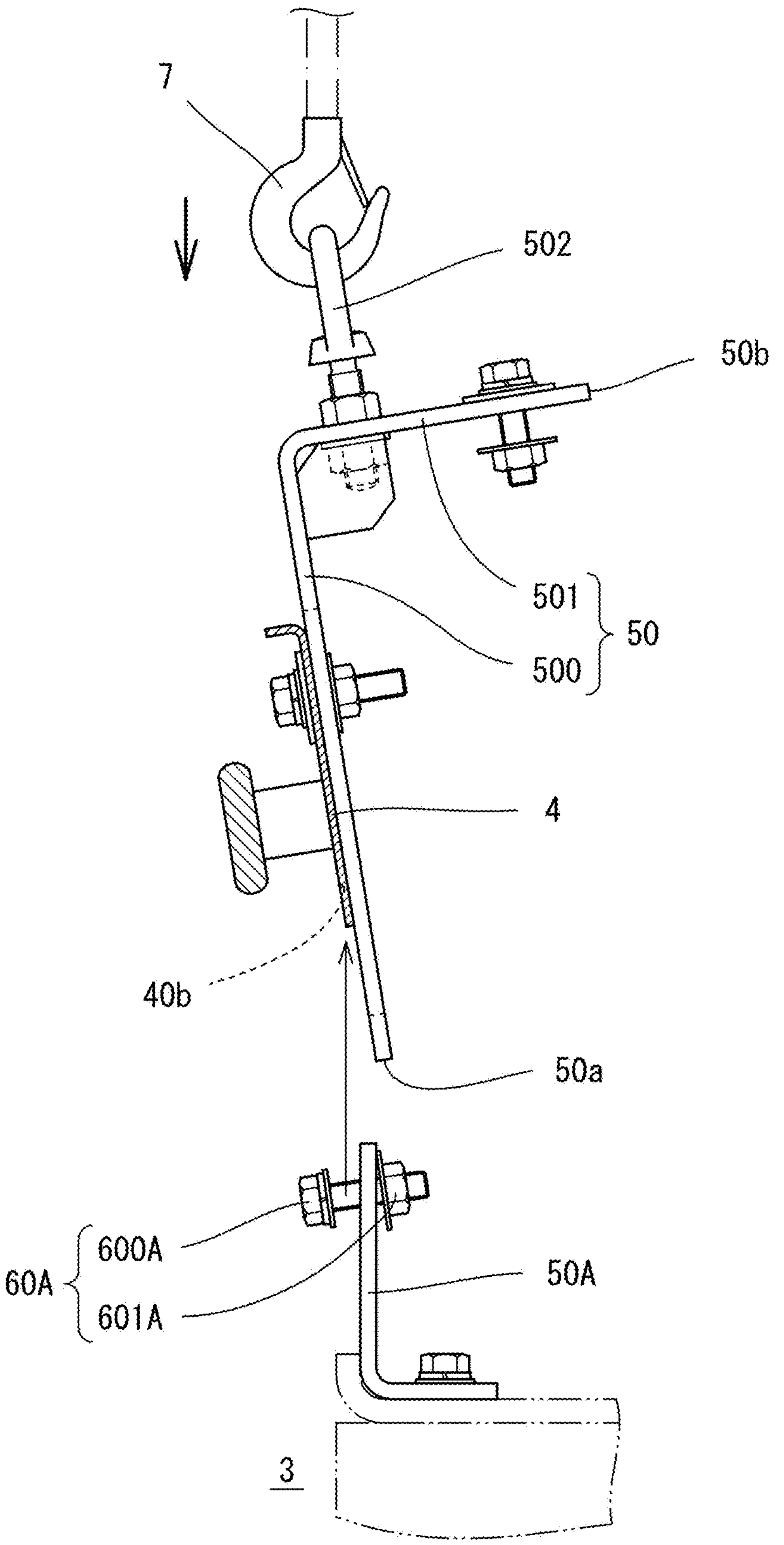
FIG. 23 is an explanatory view of the installation work.

Additionally, according to the elevator 1 of this embodiment, the bracket 50 includes the engaged part 502 at a location on the rear protrusion part 501 that is behind the center of gravity of the integrated structure. Thus, as shown in FIG. 23, when the integrated structure is suspended by a suspension tool 7 at the engaged part 502, the support frame 4 is inclined with the lower side positioned toward the rear. In this state, when the integrated structure is lowered, the shaft portion of the bolt 600A of the fastener 60A attached to the lower bracket 50A becomes easier to be inserted into the notched hole 40*b* of the support frame 4. Therefore, in the installation work of the door opening/closing device 35, the work of assembling the integrated structure to the car 3 can be performed smoothly.

It should be noted that the disclosure is not limited to the embodiment described above, and various modifications are possible within the scope that does not deviate from the essence of the disclosure. And the operation and effect of the present invention are not limited to the above embodiments. That is, the embodiments disclosed herein should be considered to be illustrative in all respects and not restrictive. The scope of the present invention is indicated by the appended claims, not by the above description. It is also contemplated that the scope of the present invention includes all modifications within the meaning and scope of equivalence to the claims.

In the above embodiment, the door devices 30 and 22 are of the center-opening type (2CO) with one door respectively on the left and right sides. However, the disclosure is not limited thereto. It goes without saying that the disclosure is also applicable to a side-opening type (2S) door device with two doors, a center-opening type (4CO) door device with two doors respectively on the left and right sides, and a side-opening type (1S) door device with one door.

Further, in the above embodiment, the door rail 33 is provided separately from the support frame 4 and is attached to the front face of the support frame 4 via the legs 33*a*. However, the disclosure is not limited thereto. The door rail may be formed by appropriately bending the plate material of the support frame and may be provided integrally with the support frame.

In the above embodiment, the first pulley is the drive pulley 351 and the second pulley 352 is the idler pulley. However, the disclosure is not limited thereto. The first pulley may be a reduction pulley that receives rotation transmitted from the drive motor via a reduction belt.

Additionally, in the above embodiment, the rear protrusion part 501 in the bracket 50 is formed by bending the upper portion of a single plate material rearward. However, the disclosure is not limited thereto. The rear protrusion part may be a separate component from the main body part and may be joined to the main body part by welding or the like. Besides, the position of the rear protrusion part is not limited to the upper edge of the main body part.

Moreover, as long as there is no physical interference, it is naturally possible to apply the technical elements described above to other configurations, replace the technical elements described above with other configurations, and combine the technical elements described above with each other, and this is, of course, intended by the disclosure.

What is claimed is:

1. A car of an elevator, comprising:

a door rail, supporting a car door to be slidable in a left-right direction;

a first pulley and a second pulley provided to be spaced apart in the left-right direction above the door rail, and a drive belt operatively connected to the car door and being wound around the first pulley and the second pulley;

a door position detection part, detecting that the car door is at a predetermined position; and a support frame, being a plate-shaped member that is long in the left-right direction, and the support frame comprising: the door rail disposed on a front face of the support frame, and brackets separately disposed at a plurality of locations on an upper edge of the support frame in the left-right direction, wherein the first pulley, the second pulley, and the door position detection part are respectively supported by the brackets separately disposed, wherein the car door comprises a roller that engages with an upper edge of the door rail from above and rotates, and the upper edge of the support frame is positioned lower than an uppermost portion of the roller.

2. The car of the elevator according to claim 1, further comprising:

a drive motor, directly connected to the first pulley, wherein the drive motor is supported on the support frame via one of the brackets.

3. The car of the elevator according to claim 1, wherein the support frame is the plate-shaped member that is long in the left-right direction and is arranged along a vertical plane, and the brackets are attached to a rear face of the support frame.

4. The car of the elevator according to claim 1, wherein the support frame is a member that is long in the left-right direction and is arranged along a vertical plane, and the first pulley, the second pulley, and the door position detection part are arranged in an open space between a front offset plane and a rear offset plane with reference to the vertical plane of the support frame, above the support frame.

5. The car of the elevator according to claim 4, further comprising:

a cover that covers a part or entirety of the open space from front, rear, and above.

6. A car of an elevator, comprising:

a door rail, supporting a car door to be slidable in a left-right direction;

a first pulley and a second pulley provided to be spaced apart in the left-right direction above the door rail, and a drive belt operatively connected to the car door and being wound around the first pulley and the second pulley;

a door position detection part, detecting that the car door is at a predetermined position; and a support frame, comprising the door rail on a front face and brackets at a plurality of locations on an upper edge, and the support frame supporting the first pulley, the second pulley, and the door position detection part via the brackets, wherein the car door comprises a roller that engages with an upper edge of the door rail from above and rotates, and the upper edge of the support frame is positioned lower than an uppermost portion of the roller, wherein the car of the elevator further comprises: a drive motor, directly connected to the first pulley, wherein the drive motor is supported on the support frame via one of the brackets, wherein the support frame comprises:

a main body part; and a front protrusion part that protrudes forward from at least a part of an upper edge of the main body part, the bracket supporting the drive motor has an upper face in a part, and is attached to the support frame so that the upper face is at the same height position as an upper face of the front protrusion part, and the drive motor has a base face, and is attached to the bracket so that the base face straddles and contacts the upper face of the front protrusion part and the upper face of the bracket.

7. The car of the elevator according to claim 1, wherein the support frame is the plate-shaped member that is long in the left-right direction and is arranged along a vertical plane, and the brackets are attached to the support frame using a fastener that is able to be fixed and released by a rotational operation from a side of the front face of the support frame.

8. The car of the elevator according to claim 1, wherein the car door comprises:

a door panel; and a door hanger that is attached to an upper end portion of the door panel, the door hanger comprises an extension part where a portion of a main body part of the support frame protrudes and extends upward, and the car door is connected to the drive belt at the extension part.

9. The car of the elevator according to claim 8, wherein the extension part comprises a detection piece for the door position detection part.

10. An elevator, comprising the car of the elevator according to claim 1.

11. The car of the elevator according to claim 1, wherein the support frame comprises:

a main body part; and a front protrusion part that protrudes forward from at least a part of an upper edge of the main body part, and the brackets have an upper face in a part, and is attached to the support frame so that the upper face is at the same height position as an upper face of the front protrusion part.

12. The car of the elevator according to claim 6, wherein the drive motor is attached to the bracket so that a tip of the base face aligns with a tip of the upper face of the front protrusion part.

13. An elevator, comprising the car of the elevator according to claim 6.

14. A car of an elevator, comprising:

a door rail, supporting a car door to be slidable in a left-right direction;

a first pulley and a second pulley provided to be spaced apart in the left-right direction above the door rail, and a drive belt operatively connected to the car door and being wound around the first pulley and the second pulley;

a door position detection part, detecting that the car door is at a predetermined position; and a support frame, comprising the door rail on a front face and brackets at a plurality of locations on an upper edge, and the support frame supporting the first pulley, the second pulley, and the door position detection part via the brackets, wherein the car door comprises a roller that engages with an upper edge of the door rail from above and rotates, and the upper edge of the support frame is positioned lower than an uppermost portion of the roller, wherein the support frame comprises a pair of brackets spaced apart in the left-right direction on a rear face, and each of the pair of brackets comprises:

a main body part, attached to the support frame; and a rear protrusion part, protruding rearward from an upper portion of the main body part, wherein a lower end of the main body part and a tip of the rear protrusion part are grounded to function as a base of the support frame.

15. The car of the elevator according to claim 14, wherein each of the pair of brackets has a length in an up-down direction that is longer than a length of the support frame in the up-down direction.

16. The car of the elevator according to claim 14, wherein each of the pair of brackets is attached to the support frame so as to be changeable in position in the up-down direction.

17. The car of the elevator according to claim 14, wherein each of the pair of brackets comprises an engaged part for a suspension tool at a location on the rear protrusion part that is behind a center of gravity of an integrated structure of the door rail, the drive motor, the first pulley, the second pulley, and the support frame.

18. An elevator, comprising the car of the elevator according to claim 14.

* * * * *